US012346045B2

(12) United States Patent
Ueno et al.

(10) Patent No.: US 12,346,045 B2
(45) Date of Patent: Jul. 1, 2025

(54) HEATER AND IMAGE FORMING APPARATUS

(71) Applicant: Toshiba Lighting & Technology Corporation, Yokosuka (JP)

(72) Inventors: Kousuke Ueno, Ehime-ken (JP); Masahiko Tamai, Ehime-ken (JP); Shinjiro Aono, Ehime-ken (JP); Akio Tsubouchi, Ehime-ken (JP); Satoko Kato, Ehime-ken (JP); Masahiro Doi, Ehime-ken (JP); Tsuyoshi Ohashi, Ehime-ken (JP); Makoto Sakai, Ehime-ken (JP)

(73) Assignee: Toshiba Lighting & Technology Corporation, Yokosuka (JP)

( * ) Notice: Subject to any disclaimer, the term of this patent is extended or adjusted under 35 U.S.C. 154(b) by 0 days.

(21) Appl. No.: 18/172,910

(22) Filed: Feb. 22, 2023

(65) Prior Publication Data

US 2023/0418197 A1 Dec. 28, 2023

(30) Foreign Application Priority Data

Jun. 23, 2022 (JP) ................................ 2022-100977
Jul. 7, 2022 (JP) ................................ 2022-109563
Jul. 26, 2022 (JP) ................................ 2022-118636

(51) Int. Cl.
*G03G 15/20* (2006.01)

(52) U.S. Cl.
CPC ..... *G03G 15/2057* (2013.01); *G03G 15/2017* (2013.01); *G03G 15/2053* (2013.01); *G03G 2215/2003* (2013.01); *G03G 2215/2035* (2013.01)

(58) Field of Classification Search
CPC ........... G03G 15/2057; G03G 15/2017; G03G 15/2053; G03G 2215/2003; G03G 2215/2035
See application file for complete search history.

(56) References Cited

U.S. PATENT DOCUMENTS

2001/0032835 A1 10/2001 Murooka et al.
2021/0286296 A1* 9/2021 Ikeno ................. G03G 15/2053
2021/0405561 A1* 12/2021 Nakashima ........ G03G 15/2057

FOREIGN PATENT DOCUMENTS

JP 2007-240606 A 9/2007

* cited by examiner

*Primary Examiner* — Joseph S Wong
(74) *Attorney, Agent, or Firm* — Banner & Witcoff, Ltd.

(57) ABSTRACT

A heater according to embodiments includes: a base portion which contains metal, extends in a first direction, and has a first surface and a second surface facing the first surface; an insulating layer which is provided on the first surface side of the base portion; a heating element which is provided on the insulating layer and extends in the first direction; and a protection portion which covers the heating element. A peripheral edge of the base portion in a second direction intersecting the first direction extends in a third direction intersecting the first direction and the second direction.

19 Claims, 19 Drawing Sheets

HEATER AND IMAGE FORMING APPARATUS

CROSS-REFERENCE TO RELATED APPLICATIONS

This application is based upon and claims the benefit of priority from Japanese Patent Application No. 2022-100977, filed on Jun. 23, 2022; Japanese Patent Application No. 2022-118636, filed on Jul. 26, 2022; Japanese Patent Application No. 2022-109563, filed on Jul. 7, 2022; the entire contents of which are incorporated herein by reference.

FIELD

Exemplary embodiments described herein relate generally to a heater and an image forming apparatus.

BACKGROUND

An image forming apparatus such as a copier and a printer is equipped with a heater for fixing toner. Generally, such a heater includes an elongated base portion, a heating element which is provided on one side of the base portion and extends in the longitudinal direction of the base portion, and a protection portion which covers the heating element.

The base portion is made of a material having heat resistance and insulating properties and having high thermal conductivity. The base portion is made of, for example, ceramics such as aluminum oxide. Further, the base portion may be, for example, a metal plate of which a surface is covered with an insulating material.

The protection portion is made of a material that has heat resistance, insulating properties, high thermal conductivity, and high chemical stability. For example, the protection portion is made of ceramics, glass, or the like.

Here, when the base portion is made of metal, the rigidity of the base portion can be improved and the manufacturing cost can be reduced. Incidentally, when the material of the base portion is metal, the material of the base portion and the material of the protection portion are different. Accordingly, thermal stress is generated due to the difference in thermal expansion coefficient between the materials. When thermal stress is generated, the heater tends to warp. Further, since the thermal expansion coefficient of metals is higher than that of ceramics, the thermal stress tends to increase. When the thermal stress increases, the warpage of the heater increases.

When the warpage of the heater increases, there is a risk that the distance between the heater and the heating object varies and the heating object may be heated unevenly.

Here, it is desired to develop a technique that can suppress the warpage of the heater even when the material of the base portion is metal.

DETAILED DESCRIPTION

Figure 1:
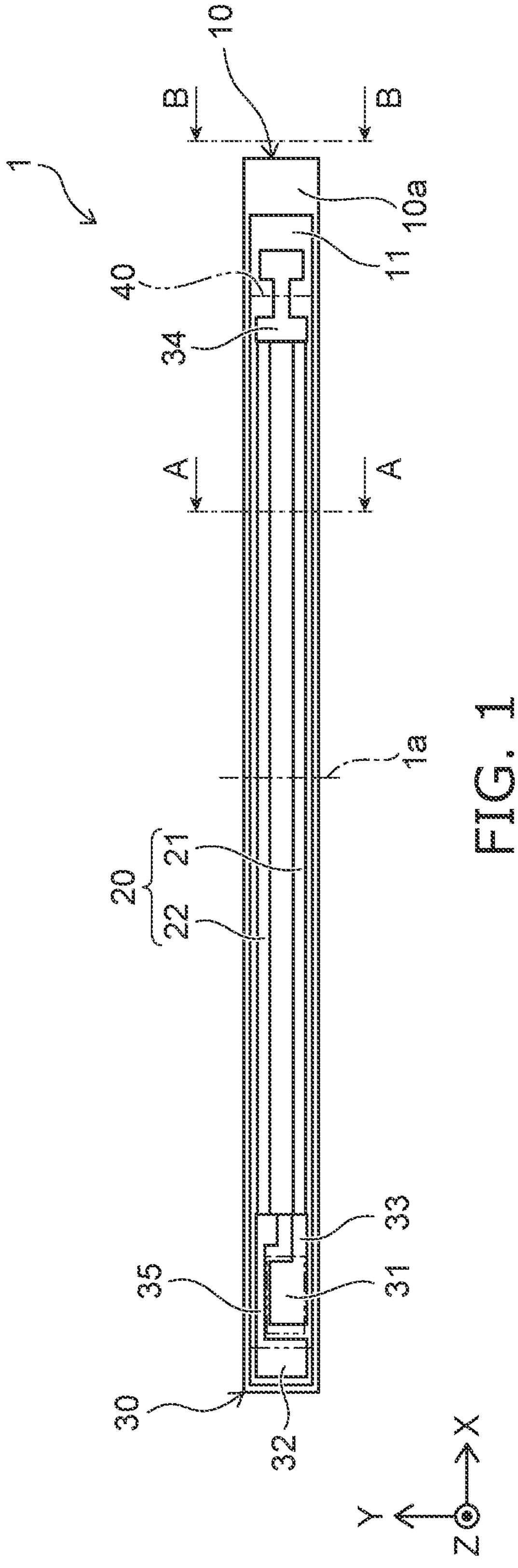
FIG. 1 is a schematic front view illustrating a heater according to this embodiment.

A heater according to an embodiment includes: a base portion which contains metal, extends in a first direction, and includes a first surface and a second surface facing the first surface; an insulating layer which is provided on the first surface side of the base portion; a heating element which is provided on the insulating layer and extends in the first direction; and a protection portion which covers the heating element. A peripheral edge of the base portion in a second direction intersecting the first direction extends in a third direction intersecting the first direction and the second direction.

Hereinafter, embodiments will be illustrated with reference to the drawings. Additionally, in each drawing, the same constituent elements are denoted by the same reference numerals, and detailed description thereof will be omitted as appropriate. Further, arrows X, Y, and Z in each drawing represent three directions orthogonal to each other. For example, the longitudinal direction of the base portion is the X direction, the lateral direction (width direction) of the base portion is the Y direction, and the direction perpendicular to the surface of the base portion is the Z direction.

(Heater)

FIG. 1 is a schematic front view illustrating a heater 1 according to this embodiment.

Additionally, FIG. 1 is a view in which the heater 1 is viewed from the installation side of a heating portion 20.

Figure 2:
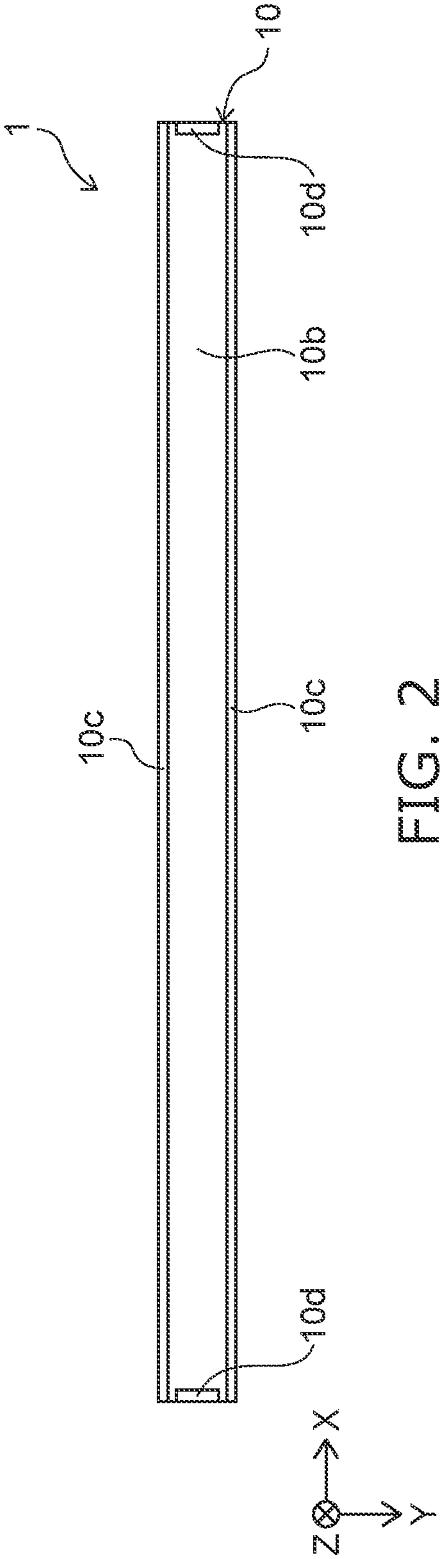
FIG. 2 is a schematic rear view illustrating the heater.

FIG. 2 is a schematic rear view illustrating the heater 1.

Additionally, FIG. 2 is a view in which the heater 1 is viewed from the side opposite to the installation side of the heating portion 20.

Figure 3:
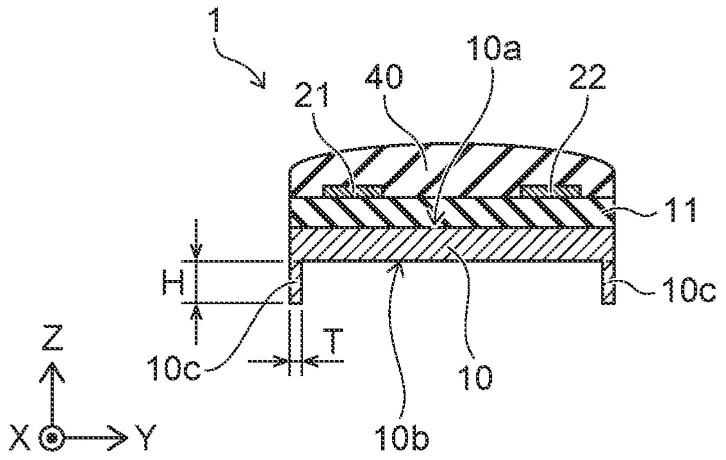
FIG. 3 is a schematic cross-sectional view in a direction taken along a line A-A of the heater of FIG. 1.

FIG. 3 is a schematic cross-sectional view in a direction taken along a line A-A of the heater 1 of FIG. 1.

Figure 4:
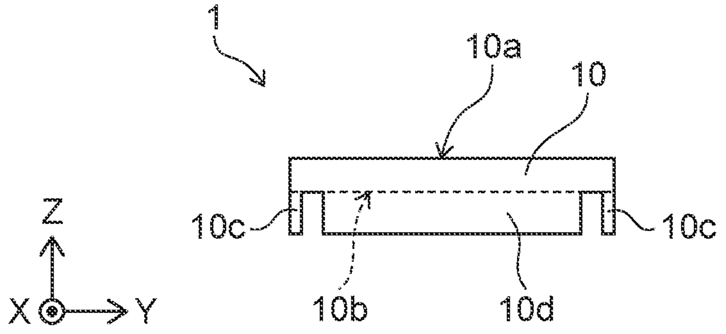
FIG. 4 is a schematic side view in a direction taken along a line B-B of the heater of FIG. 1.

FIG. 4 is a schematic side view in a direction taken along a line B-B of the heater 1 of FIG. 1.

As illustrated in FIGS. 1 to 4, the heater 1 includes, for example, a base portion 10, an insulating layer 11, the heating portion 20, a wiring portion 30, and a protection portion 40.

The base portion 10 has a plate shape and includes a surface 10*a* (corresponding to an example of the first surface) and a surface 10*b* (corresponding to an example of the second surface) facing the surface 10*a*. The base portion 10 has a shape extending in the X direction. The shape of the base portion 10 when viewed from the Z direction is, for example, an elongated rectangular shape. The thickness (the distance between the surface 10*a* and the surface 10*b*) of the base portion 10 is, for example, about 0.3 mm to 1.0 mm. The dimension of the base portion 10 in the X direction and the dimension of the base portion 10 in the Y direction can be appropriately changed according to the size of the heating object (for example, paper).

The base portion 10 is made of a material having heat resistance and high thermal conductivity. The base portion 10 can be made of, for example, metal such as stainless steel or an aluminum alloy.

The thermal conductivity of metals is higher than that of inorganic materials such as ceramics. Therefore, if the base portion 10 is made of metal, it is possible to suppress the in-plane distribution of the temperature of the heater 1. Further, it is possible to improve the rigidity of the base portion 10 and reduce the manufacturing cost.

The insulating layer 11 is provided on the surface 10*a* on the installation side of the heating portion 20 in the base portion 10. The insulating layer 11 covers an installation region of the heating portion 20 in the surface 10*a* of the base portion 10. The insulating layer 11 is made of a material having heat resistance and insulating properties. The insulating layer 11 can be made of, for example, an inorganic material such as ceramics.

The heating portion 20 converts the applied electric power into heat (Joule heat). The heating portion 20 is provided on the insulating layer 11. The heating portion 20 and the base portion 10 are insulated by the insulating layer 11.

The heating portion 20 includes, for example, a heating element 21 and a heating element 22. As an example, a case in which the heating element 21 and the heating element 22 are provided is illustrated, but the number or size of the heating element can be appropriately changed in response to the size of the base portion 10, the size of the heating object, and the like. Further, it is also possible to provide multiple types of heating elements with different lengths, widths, shapes, and the like. That is, at least one heating element may be provided.

For example, the heating element 21 and the heating element 22 can be arranged side by side with a predetermined interval in the Y direction (the lateral direction of the base portion 10). The heating element 21 and the heating element 22 extend, for example, in the X direction (the longitudinal direction of the base portion 10).

The X-direction dimensions (length dimensions) of the heating element 21 and the heating element 22 can be substantially the same, for example. In this case, it is preferable that the respective centers of the heating element 21 and the heating element 22 are located on a line 1*a*. That is, it is preferable that each of the heating element 21 and the heating element 22 have a shape that is symmetrical about the line 1*a* as an axis of symmetry.

When the heater 1 is attached to an image forming apparatus 100, for example, the line 1*a* is made to overlap the center line of the conveying path of the heating object. In this way, the heating object can be substantially uniformly heated even when the dimension of the heating object in a direction orthogonal to the conveying direction changes.

The electric resistance values of the heating element 21 and the heating element 22 can be substantially the same or different. For example, the electric resistance values of the heating element 21 and the heating element 22 can be made substantially the same by setting the X-direction dimension (the length dimension), the Y-direction dimension (the width dimension), and the Z-direction dimension (the thickness dimension) of the heating element 21 and the heating element 22 to be substantially the same. Also, the electric resistance values of the heating element 21 and the heating element 22 can be made different by changing at least one of these dimensions. Further, the electric resistance values of the heating element 21 and the heating element 22 can be made different by changing the material.

Further, the electric resistance value per unit length of the heating element 21 can be substantially uniform in the X direction. For example, the Y-direction dimension (the width dimension) and the Z-direction dimension (the thickness dimension) of the heating element 21 can be substantially constant. The shape of the heating element 21 when viewed from the Z direction is, for example, a substantially rectangular shape extending in the X direction.

Further, the electric resistance value per unit length of the heating element 22 can be substantially uniform in the X direction. For example, the Y-direction dimension (the width dimension) and the Z-direction dimension (the thickness dimension) of the heating element 22 can be substantially constant. The shape of the heating element 22 when viewed from the Z direction is, for example, a substantially rectangular shape extending in the X direction.

The heating element 21 and the heating element 22 can be formed using, for example, ruthenium oxide ($RuO_2$), silver-palladium (Ag—Pd) alloy, or the like. The heating element 21 and the heating element 22 can be formed, for example, by applying a paste-like material onto the insulating layer 11 using a screen printing method or the like and curing the material using a baking method or the like.

The wiring portion 30 is provided on the insulating layer 11.

The wiring portion 30 includes, for example, a terminal 31, a terminal 32, a wiring 33, a wiring 34, and a wiring 35.

The terminals 31 and 32 are provided in the vicinity of, for example, one end portion of the base portion 10 in the X direction. The terminals 31 and 32 are arranged side by side, for example, in the X direction. The terminals 31 and 32 are electrically connected to, for example, a power-supply or the like via a connector and a wiring.

The wiring 33 is provided at, for example, the installation side of the terminal 31 of the base portion 10 in the X direction. The wiring 33 extends in the X direction. The wiring 33 is electrically connected to the terminal 31 and the end portion on the terminal 31 side of the heating element 21.

The wiring 34 is provided in the vicinity of, for example, the end portion on the side opposite to the installation side of the terminals 31 and 32 of the base portion 10 in the X direction. The end portion on the side opposite to the wiring 33 of the heating element 21 and the end portion on the side opposite to the wiring 35 of the heating element 22 are electrically connected to the wiring 34.

The wiring 35 is provided at, for example, the installation side of the terminal 32 of the base portion 10 in the X direction. The wiring 35 extends in the X direction. The wiring 35 is electrically connected to the terminal 32 and the end portion on the terminal 32 side of the heating element 22.

The wiring portion 30 (the terminals 31 and 32 and the wirings 33 to 35) is formed using, for example, a material containing silver, copper, or the like. For example, the terminals 31 and 32 and the wirings 33 to 35 can be formed by applying a paste-like material onto the insulating layer 11 using a screen printing method or the like and hardening the paste-like material using a baking method or the like.

The protection portion 40 is provided on the insulating layer 11 and covers the heating portion 20 (the heating element 21 and the heating element 22) and a part of the wiring portion 30 (the wiring 33, the wiring 34, and the wiring 35). In this case, the terminal 31 and the terminal 32 of the wiring portion 30 are exposed from the protection portion 40.

The protection portion 40 extends in the X direction. The protection portion 40 has, for example, a function of insulating a part of the heating portion 20 and the wiring portion 30, a function of transferring heat generated in the heating portion 20, and a function of protecting a part of the heating portion 20 or the wiring portion 30 from external force, corrosive gas, and the like. The protection portion 40 is made of a material having heat resistance and insulation and having high chemical stability and thermal conductivity. The protection portion 40 is made of, for example, ceramics, glass, or the like. In this case, the protection portion 40 can be formed using glass to which a filler containing a material with high thermal conductivity such as aluminum oxide is added. The thermal conductivity of glass to which a filler is added can be, for example, 2 [W/(m·K)] or more.

Further, the heater 1 can be further provided with a detection unit which detects the temperature of the heating portion 20. The detection unit can be, for example, a thermistor. The detection unit can be provided on at least one of the installation side of the heating portion 20 of the base portion 10 and the side opposite to the installation side of the heating portion 20 of the base portion 10.

When the detection unit is provided on the installation side of the heating portion 20 of the base portion 10 (the surface 10*a* side of the base portion 10), the detection unit can be provided on the insulating layer 11 together with the wiring and the terminal electrically connected to the detection unit. The wiring electrically connected to the detection unit can be covered by the protection portion 40. The terminal electrically connected to the detection unit can be exposed from the protection portion 40.

When the detection unit is provided on the side opposite to the installation side of the heating portion 20 of the base portion 10 (the surface 10*b* side of the base portion 10), the insulating layer can be provided on the surface 10*b* and the detection unit can be provided on the insulating layer together with the wiring and the terminal electrically connected to the detection unit. The insulating layer can be similar to the insulating layer 11 provided on the surface 10*a*. Further, the wiring electrically connected to the detection unit can be covered by the protection portion. The terminal electrically connected to the detection unit can be exposed from the protection portion. The protection portion can be similar to the protection portion 40 provided on the insulating layer 11.

Here, as described above, the base portion 10 is made of metal such as stainless steel or aluminum alloy. On the other hand, the protection portion 40 is made of, for example, ceramics, glass, glass to which a filler is added, or the like. The insulating layer 11 is made of, for example, an inorganic material such as ceramics.

Therefore, the thermal expansion coefficient of the base portion 10 is different from the thermal expansion coefficients of the protection portion 40 and the insulating layer 11. Further, when the heating portion 20 (the heating element 21 and the heating element 22) generates heat when using the heater 1, the base portion 10, the protection portion 40, and the insulating layer 11 are heated. When the protection portion 40 or the insulating layer 11 is baked when manufacturing the heater 1, the base portion 10, the protection portion 40, and the insulating layer 11 are heated. Therefore, when the heater 1 is used or manufactured, thermal stress is generated due to the difference in thermal expansion coefficient between the materials. When thermal stress is generated, the heater 1 may warp.

Further, since the thermal expansion coefficient of metal is higher than that of ceramics or the like, the heater 1 tends to warp greatly. Further, even when the length of the base portion 10 in the lateral direction (the width direction: for example, the Y direction) is short, the length of the base portion 10 in the longitudinal direction (for example, the X direction) is long, or the thickness of the base portion 10 is thin, warpage of the heater 1 tends to increase.

When the warpage of the heater 1 increases, the distance between the heater 1 and the heating object varies and hence the heating object may be heated unevenly.

Here, the peripheral edge of the base portion 10 extends in the Z direction. For example, as illustrated in FIGS. 2 to 4, the base portion 10 is provided with a convex portion 10*c* and a convex portion 10*d*. The convex portion 10*c* and the convex portion 10*d* are provided on the side opposite to the installation side of the heating portion 20 of the base portion 10. The convex portion 10*c* and the convex portion 10*d* protrude from the surface 10*b* of the base portion 10. The convex portion 10*c* and the convex portion 10*d* can be integrally formed with, for example, the base portion 10. The convex portion 10*c* and the convex portion 10*d* can be formed by, for example, press molding or bending.

The convex portion 10*c* is provided along the peripheral edge of the surface 10*b* of the base portion 10 in the Y direction. The convex portion 10*c* extends between one end portion and the other end portion of the base portion 10 in the X direction. The distance H between the top portion of the convex portion 10*c* and the surface 10*b* of the base portion 10 (the height of the convex portion 10*c*) can be, for example, about 0.3 mm to 5.0 mm. The thickness T of the convex portion 10*c* can be, for example, about 0.3 mm to 1.0 mm.

The convex portion 10*d* is provided along the peripheral edge of the surface 10*b* of the base portion 10 in the X direction. The convex portion 10*d* extends in the Y direction. As illustrated in FIGS. 2 and 4, a gap can be provided between the convex portion 10*d* and the convex portion 10*c*.

Further, the convex portion 10*d* and the convex portion 10*c* can be brought into contact with each other. The distance between the top portion of the convex portion 10*d* and the surface 10*b* of the base portion 10 (the height of the convex portion 10*d*) can be the same as or different from the distance H between the top portion of the convex portion 10*c* and the surface 10*b* of the base portion 10. The thickness of the convex portion 10*d* can be the same as or different from, for example, the thickness T of the convex portion 10*c*.

When the convex portion 10*c* and the convex portion 10*d* are provided, the bending rigidity of the base portion 10 can be increased. When the bending rigidity of the base portion 10 increases, it is possible to prevent the heater 1 from warping even when thermal stress is generated due to the difference in thermal expansion coefficient between the materials.

The convex portion 10*c* illustrated in FIGS. 2 to 4 is provided at both end portions of the base portion 10 in the Y direction. However, when the generated thermal stress is small or the length of the base portion 10 in the X direction is short, the generated warpage is small. When the generated warpage is small, the convex portion 10*c* can be configurated to be provided at one end portion of the base portion 10 and the convex portion 10*c* can be configurated not to be provided at the other end portion of the base portion 10 in the Y direction. When the convex portion 10*c* is provided only at one end portion of the base portion 10, the manufacturing cost of the heater 1 can be reduced.

Further, a case in which one convex portion 10*c* extending continuously in the X direction is provided at the end portion of the base portion 10 in the Y direction is illustrated, but the convex portion 10*c* or the plurality of convex portions 10*c* arranged in the X direction can be provided in a part of the region of the base portion 10 in the X direction.

The convex portion 10*d* illustrated in FIGS. 2 to 4 is provided at both end portions of the base portion 10 in the X direction. However, when the generated thermal stress is small or the length of the base portion 10 in the Y direction is short, the generated warpage decreases. When the generated warpage is small, the convex portion 10*d* can be configurated to be provided at one end portion of the base portion 10 and the convex portion 10*d* can be configurated not to be provided at the other end portion of the base portion 10 in the X direction. When the convex portion 10*d* is provided only at one end portion of the base portion 10, the manufacturing cost of the heater 1 can be reduced.

Further, a case in which one convex portion 10*d* extending continuously in the Y direction is provided at the end portion of the base portion 10 in the X direction is illustrated, but the convex portion 10*d* or the plurality of convex portions 10*d* arranged in the Y direction can be provided in a part of the region of the base portion 10 in the Y direction.

Further, the length of the base portion 10 in the X direction is longer than that of the base portion 10 in the Y direction. Therefore, the warping of the base portion 10 in the X direction is larger than that of the base portion 10 in the Y direction.

In this case, the height of the convex portion 10*c* can be made higher than that of the convex portion 10*d*. The thickness of the convex portion 10*c* can be made thicker than that of the convex portion 10*d*. In this way, it is possible to suppress an increase in warping of the base portion 10 in the X direction.

Figure 5:
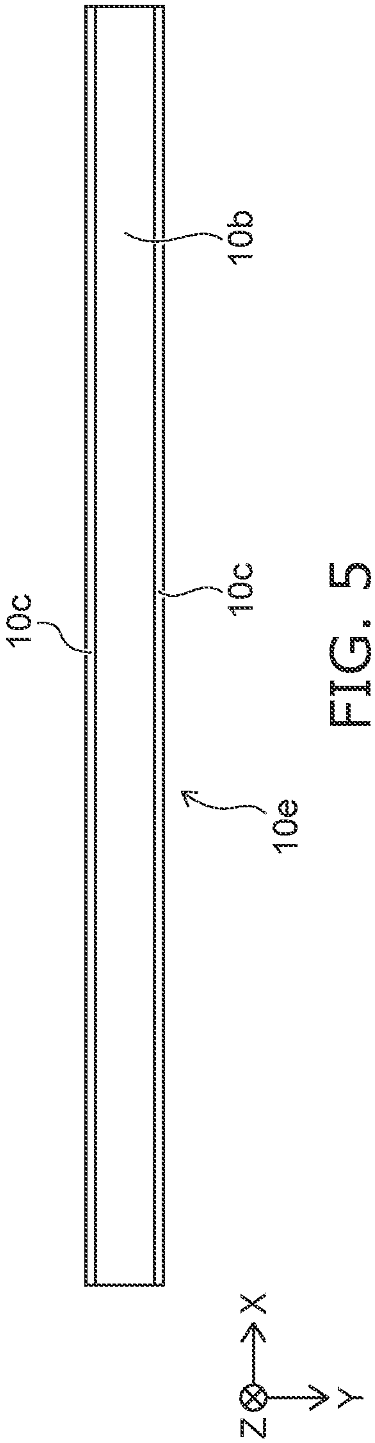
FIG. 5 is a schematic rear view illustrating a base portion according to another embodiment.

FIG. 5 is a schematic rear view illustrating a base portion 10*e* according to another embodiment.

Additionally, FIG. 5 is a view in which the base portion 10*e* is viewed from the side opposite to the installation side of the heating portion 20.

The length of the base portion 10*e* in the Y direction is shorter than that of the base portion 10*e* in the X direction. Therefore, the warpage of the base portion 10*e* in the Y direction is smaller than that of the base portion 10*e* in the X direction.

In such a case, as illustrated in FIG. 5, the convex portion 10*c* can be configurated to be provided at the end portion of the base portion 10*e* in the Y direction and the convex portion 10*d* can be configurated not to be at the end portion of the base portion 10*e* in the X direction. Additionally, when the warpage of the base portion 10*e* is small, the convex portion 10*c* can be configurated to be provided at one end portion of the base portion 10*e* and the convex portion 10*c* can be configurated not to be provided at the other end portion of the base portion 10*e* in the Y direction.

In this way, the manufacturing cost of the heater 1 can be reduced.

Figure 6:
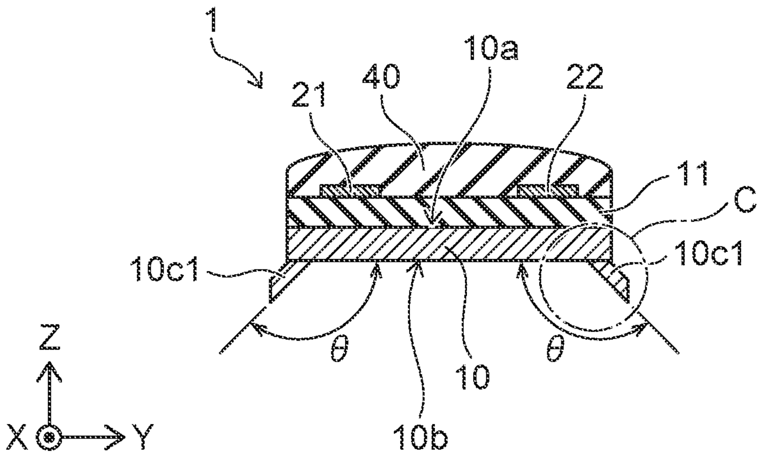
FIG. 6 is a schematic cross-sectional view illustrating a convex portion according to another embodiment.

FIG. 6 is a schematic cross-sectional view illustrating a convex portion 10*c*1 according to another embodiment.

Figure 7:
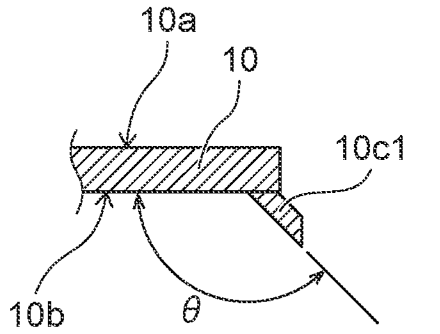
FIG. 7 is a schematic enlarged view of a C part of FIG. 6.

FIG. 7 is a schematic enlarged view of a C part of FIG. 6.

The convex portion 10*c* illustrated in FIGS. 3 and 4 is orthogonal to the surface 10*b* of the base portion 10.

On the other hand, the convex portion 10*c*1 illustrated in FIGS. 6 and 7 is inclined with respect to the surface 10*b* of the base portion 10. For example, the convex portion 10*c*1 can be formed by tilting the convex portion 10*c*. The inclination angle θ between the convex portion 10*c*1 and the surface 10*b* of the base portion 10 can be, for example, "$90° < \theta \leq 160°$". Further, the inclination angle θ between the convex portion 10*c*1 and the surface 10*b* of the base portion 10 can be, for example, "$20° \leq \theta < 90°$".

When the convex portion 10*c*1 is inclined with respect to the surface 10*b* of the base portion 10, it is possible to improve the bending rigidity of the base portion 10 and suppress an increase in dimension of the heater 1 in the Z direction. Further, since the tip of the convex portion 10*c*1 is located inside the surface 10*b* of the base portion 10 when viewed from the Z direction in the case of "$20° \leq \theta < 90°$", it is possible to improve the bending rigidity of the base portion 10 and suppress an increase in dimension of the heater 1 in the Z direction and the Y direction.

The arrangement, number, dimension, inclination angle θ, and the like of the convex portion 10*c* and the convex portion 10*d* can be appropriately changed according to the magnitude of the generated thermal stress or warpage. The arrangement, number, dimension, inclination angle θ, and the like of the convex portion 10*c* and the convex portion 10*d* can be appropriately determined by performing, for example, an experiment or simulation.

Figure 8:
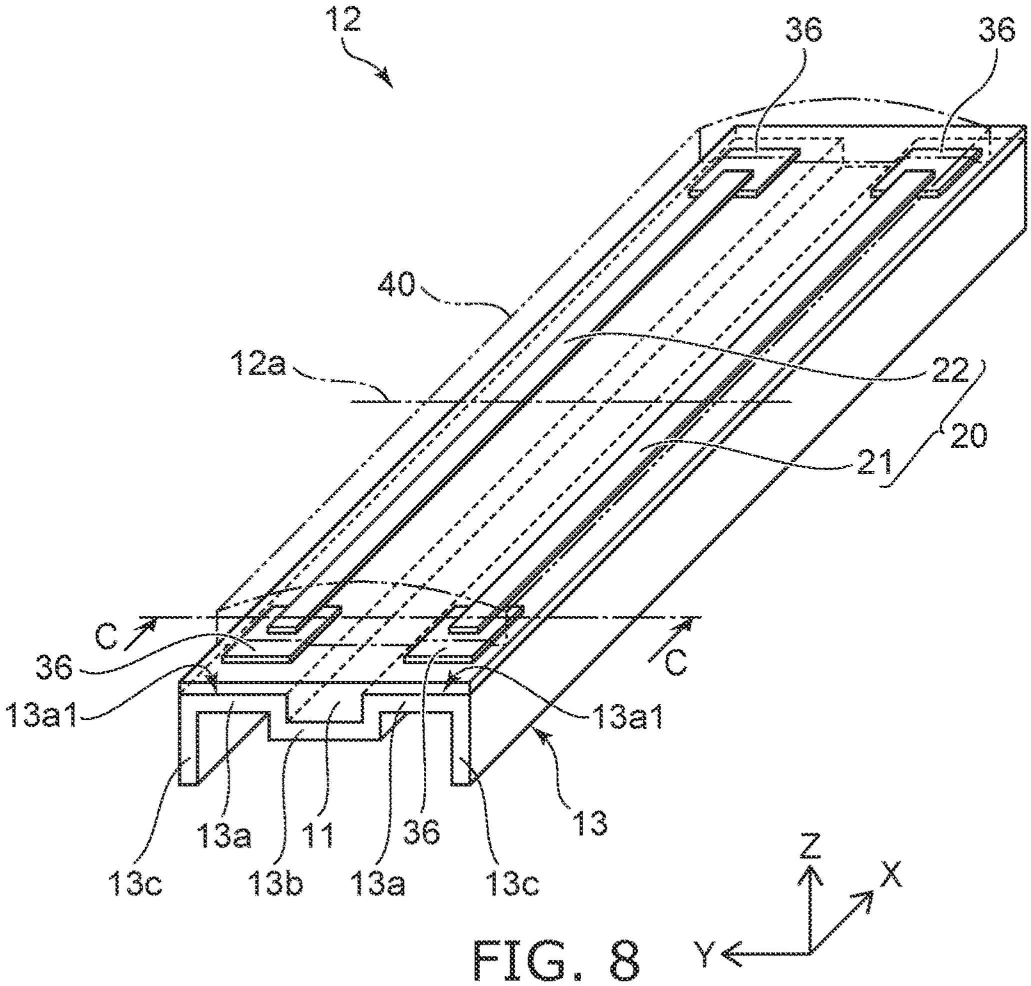
FIG. 8 is a schematic perspective view illustrating a heater according to another embodiment.

FIG. 8 is a schematic perspective view illustrating a heater 12 according to another embodiment.

Figure 9:
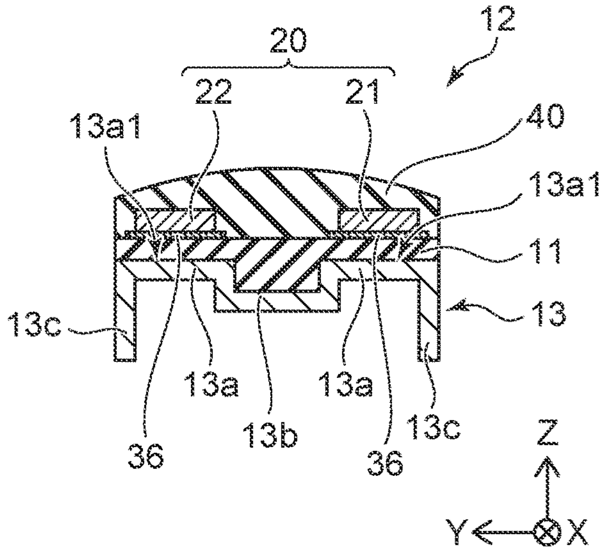
FIG. 9 is a schematic cross-sectional view in a direction taken along a line C-C of the heater of FIG. 8.

FIG. 9 is a schematic cross-sectional view in a direction taken along a line C-C of the heater 12 of FIG. 8.

Figure 10:
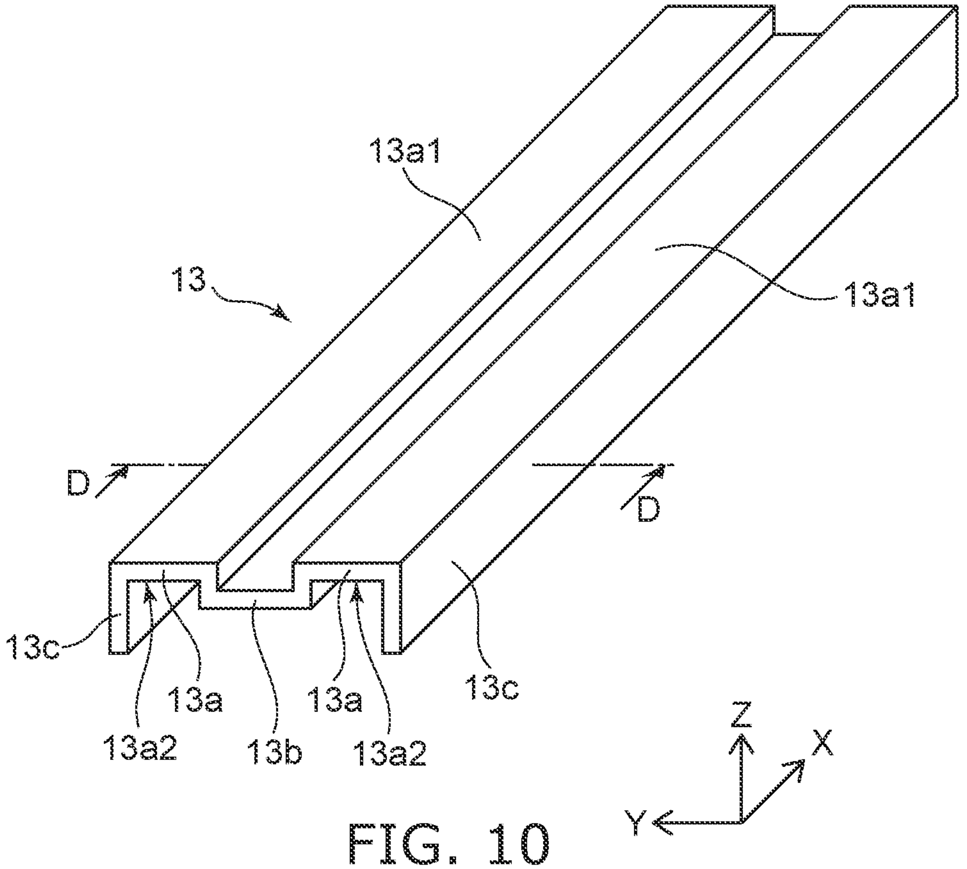
FIG. 10 is a schematic perspective view of a base portion.

FIG. 10 is a schematic perspective view of a base portion 13.

Figure 11:
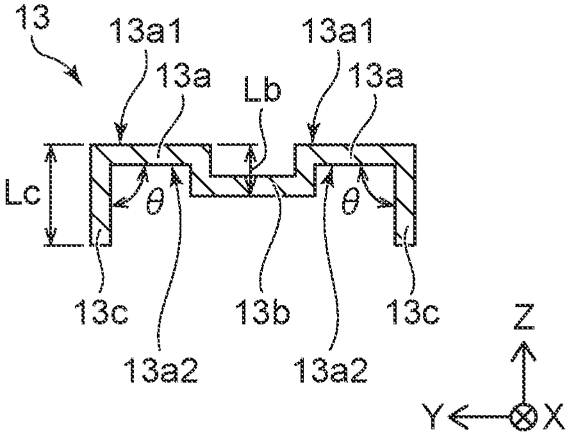
FIG. 11 is a schematic cross-sectional view in a direction taken along a line D-D of the base portion of FIG. 10.

FIG. 11 is a schematic cross-sectional view in a direction taken along a line D-D of the base portion 10 of FIG. 10.

As illustrated in FIGS. 8 and 9, the heater 12 includes, for example, the base portion 13, the insulating layer 11, the heating portion 20, a terminal 36, and the protection portion 40.

As illustrated in FIGS. 8 to 11, the base portion 13 extends in the X direction. The peripheral edge of the base portion 13 extends in the Z direction. The base portion 13 includes, for example, a first portion 13*a*, a second portion 13*b*, and a third portion 13*c*. In the Z direction, the second portion 13*b* and the third portion 13*c* are provided on the same side of the first portion 13*a*. For example, the first portion 13*a*, the second portion 13*b*, and the third portion 13*c* can be integrally formed with each other.

The first portion 13*a* has a plate shape and is provided at a plurality of positions. The plurality of first portions 13*a* extend in the X direction and are arranged side by side in the Y direction at predetermined intervals. Additionally, two first portions 13*a* are provided in the base portion 13 illustrated in FIGS. 8 to 11, but three or more first portions 13*a* can be provided. The number and intervals of the first portions 13*a* can be appropriately changed according to, for example, the size of the heating object.

In the X direction, each of the plurality of first portions 13*a* may be provided at the same position or may be provided at different positions. Additionally, the positions in the X direction of each of the two first portions 13*a* illustrated in FIGS. 8 to 11 are the same.

It is preferable that each of the plurality of first portions 13*a* are provided at the same position in the Z direction. In this case, the heating portion 20 (the heating element 21 and the heating element 22) is provided on a surface 13*a*1 of the first portion 13*a* through the insulating layer 11. Therefore, it is preferable that each of the surfaces 13*a*1 of the plurality of first portions 13*a* are provided within the same surface in the Z direction. In this way, it is possible to suppress uneven heating of the heating object caused by variation in the distance between the heating portion 20 and the heating object.

The shape of the first portion 13*a* when viewed from the Z direction is, for example, an elongated rectangular shape. The X-direction dimension of the first portion 13*a* and the Y-direction dimension of the first portion 13*a* can be changed as appropriate according to the dimensions and number of heating elements to be provided. In this case, the X-direction dimension and the Y-direction dimension of each of the plurality of first portions 13*a* may be the same or different. Additionally, the X-direction dimension and the Y-direction dimension of each of the two first portions 13*a* illustrated in FIGS. 8 to 11 are the same.

As illustrated in FIGS. 10 and 11, the second portion 13*b* is provided between the first portion 13*a* and the first portion 13*a* in the Y direction. Therefore, the number of the second portions 13*b* is one less than that of the first portions 13*a*. The second portion 13*b* protrudes toward the side opposite to the surface 13*a*1 from a surface 13*a*2 facing the surface 13*a*1 of the first portion 13*a*. The second portion 13*b* is provided on the surface 13*a*2 of the first portion 13*a*. The end portion of the second portion 13*b* in the Y direction is provided at the peripheral edge of the surface 13*a*2 of the first portion 13*a* in the Y direction. For example, the second portion 13*b* has a plate shape and has a shape bent in the Z direction in the vicinity of both end portions in the Y direction. That is, the second portion 13*b* intersects the peripheral edge of the first portion 13*a*.

The third portion 13*c* has a plate shape. The third portion 13*c* is provided at the peripheral edge on the side opposite to the installation side of the second portion 13*b* in the Y direction of the surface 13*a*2 of the first portion 13*a*. That is, in the Y direction, the third portion 13*c* intersects the peripheral edge on the side opposite to the installation side of the second portion 13*b* of the first portion 13*a*. In this case, since the plurality of first portions 13*a* are arranged in the Y direction, the third portion 13*c* can be provided in at least one of two first portions 13*a* located at both ends in the Y direction. That is, at least one third portion 13*c* can be provided. The base portion 13 illustrated in FIGS. 8 to 11 is provided with the third portion 13*c* for each of the two first portions 13*a* arranged in the Y direction.

The third portion 13*c* protrudes from the surface 13*a*2 of the first portion 13*a* toward the side opposite to the surface 13*a*1 of the first portion 13*a*. As illustrated in FIG. 11, when the angle between the third portion 13*c* and the surface 13*a*2 of the first portion 13*a* is θ, the angle θ can be "$20°\leq\theta\leq160°$". When the angle θ is set in this way, the bending rigidity of the base portion 13 can be increased. In this case, the Z-direction dimension of the base portion 13 can be decreased in the case of "$20°\leq\theta<90°$" or "$90°\leq\theta\leq160°$". Further, it is possible to decrease the Z-direction dimension of the base portion 13 and suppress an increase in the Y-direction dimension of the base portion 13 in the case of "$20°\leq\theta<90°$".

Further, the dimension Lc (mm) of the third portion 13*c* in the Z direction can be the same as or different from the dimension Lb (mm) of the second portion 13*b*. In the base portion 13 illustrated in FIG. 11, "Lc (mm)>Lb (mm)" is established.

The thickness of the first portion 13*a*, the thickness of the second portion 13*b*, and the thickness of the third portion 13*c* are, for example, about 0.3 mm to 1.0 mm. Additionally, the thickness of the first portion 13*a*, the thickness of the second portion 13*b*, and the thickness of the third portion 13*c* may be the same as or different from each other.

The base portion 13 (the first portion 13*a*, the second portion 13*b*, and the third portion 13*c*) is made of a material having heat resistance and high thermal conductivity. The base portion 13 is made of, for example, metal such as stainless steel or aluminum alloy. The base portion 13 can be formed by, for example, plastic working such as bending or pressing, or drawing.

The thermal conductivity of metals is higher than that of inorganic materials such as ceramics. Therefore, when the base portion 13 is made of metal, the in-plane distribution of the temperature of the heater 12 can be suppressed. Further, it is possible to improve the rigidity of the base portion 13, suppress the occurrence of cracks and chips, and reduce the manufacturing cost.

Additionally, details of suppression of warping in the base portion 13 will be described later.

The Insulating layer 11 is provided on the installation side of the heating portion 20 of the base portion 13. The insulating layer 11 can be provided at least on the surface 13*a*1 of the first portion 13*a* of the base portion 13. In this case, as illustrated in FIGS. 8 and 9, the insulating layer 11 can be provided to cover the installation side of the heating portion 20 of the base portion 13. When the insulating layer 11 is also provided on the second portion 13*b*, the bending rigidity of the heater 12 can be improved. Therefore, the heater 12 can be suppressed from warping.

The insulating layer 11 can be formed, for example, by applying a paste-like material onto the base portion 13 using a screen printing method or the like and hardening the paste-like material using a baking method or the like.

The heating portion 20 is provided on the insulating layer 11. The heating portion 20 is provided on, for example, the first portion 13*a* of the base portion 13 through the insulating layer 11. The heating portion 20 and the base portion 13 are insulated by the insulating layer 11.

In the case of the heater 12 illustrated in FIGS. 8 and 9, the heating portion 20 includes the heating element 21 and the heating element 22. The heating element 21 and the heating element 22 extend in the X direction (the longitudinal direction of the base portion 13). The heating element 21 is provided on one first portion 13*a* through the insulating layer 11. The heating element 22 is provided on the other first portion 13*a* through the insulating layer 11. That is, the heating element 21 and the heating element 22 are provided on the side opposite to the installation side of the second portion 13*b* of the first portion 13*a* through the insulating layer 11.

Additionally, a case in which one heating element is provided on one first portion 13*a* is illustrated, but a plurality of heating elements may be provided on one first portion 13*a*. That is, at least one heating element can be provided on one first portion 13*a*. Further, a plurality of types of heating elements having different dimensions and shapes can be also provided on one first portion 13*a*.

For example, the X-direction dimensions (the length dimensions) of the heating element 21 and the heating element 22 can be substantially the same. It is preferable that the respective centers of the heating element 21 and the heating element 22 are located on a line 12*a*. That is, it is preferable that each of the heating element 21 and the heating element 22 have a shape that is symmetrical about the line 12*a* as an axis of symmetry.

When the heater 12 is attached to the image forming apparatus 100, for example, the line 12*a* is made to overlap the center line of the conveying path of the heating object. In this way, the heating object can be substantially uniformly heated even when the dimension or position of the heating object in a direction orthogonal to the conveying direction changes.

The terminal 36 can be provided at a plurality of positions. The plurality of terminals 36 are provided on the insulating layer 11. The plurality of terminals 36 can be provided, for example, in the vicinity of both end portions of the base portion 13 in the X direction. Further, as illustrated in FIG. 8, the pair of terminals 36 electrically connected to the end portion of the heating element 21 and the pair of terminals 36 electrically connected to the end portion of the heating element 22 can be provided. The plurality of terminals 36 are exposed from the protection portion 40. The plurality of terminals 36 are electrically connected to, for example, a power-supply or the like via a connector and a wiring.

Additionally, one end portions of the heating element 21 and the heating element 22 in the X direction can be electrically connected by one terminal 36, the terminal 36 can be electrically connected to the other end portion of the heating element 21 in the X direction, and the other terminal 36 can be electrically connected to the other end portion of the heating element 22 in the X direction. In this way, the heating element 21 and the heating element 22 can be connected in series to each other.

Further, one end portions of the heating element 21 and the heating element 22 in the X direction can be electrically connected by one terminal 36 and the other end portions of the heating element 21 and the heating element 22 in the X direction can be electrically connected by one terminal 36. In this way, the heating element 21 and the heating element 22 can be connected in parallel to each other.

Further, the plurality of terminals 36 can be arranged side by side in the vicinity of one end portion of the base portion 13 in the X direction. In this way, since the connector and the wiring are provided at one side of the heater 12, wiring work becomes easier.

Further, a wiring that electrically connects the terminal 36 and the heating elements 21 and 22 can be also provided. When the wiring that electrically connects the terminal 36 and the heating elements 21 and 22 is provided, the terminal 36 can be easily disposed at any position.

For example, the terminal 36 and the wiring that electrically connects the terminal 36 and the heating elements 21 and 22 are formed using a material containing silver, copper, or the like. For example, the terminal 36 and the wiring can be formed by applying a paste-like material onto the insulating layer 11 using a screen printing method or the like and curing the material using a baking method or the like.

The protection portion 40 is provided on the insulating layer 11 and covers the heating portion 20 (the heating element 21 and the heating element 22). As described above, the terminal 36 is exposed from the protection portion 40.

Further, the heater 12 can be further provided with a detection unit that detects the temperature of the heating portion 20. The detection unit can be, for example, a thermistor. The detection unit can be provided on at least one of the installation side of the heating portion 20 of the base portion 13 and the side opposite to the installation side of the heating portion 20 of the base portion 13.

When the detection unit is provided on the installation side of the heating portion 20 of the base portion 13, the detection unit can be provided on the insulating layer 11 together with the wiring and the terminal electrically connected to the detection unit. The wiring electrically connected to the detection unit can be covered by the protection portion 40. The terminal electrically connected to the detection unit can be exposed from the protection portion 40.

When the detection unit is provided on the side opposite to the installation side of the heating portion 20 of the base portion 13, the insulating layer can be provided on the base portion 13 and the detection unit can be provided on the insulating layer together with the wiring and the terminal electrically connected to the detection unit. The insulating layer can be similar to the insulating layer 11. Further, the detection unit and the wiring electrically connected to the detection unit can be covered by the protection portion. The terminal electrically connected to the detection unit can be exposed from the protection portion. The protection portion can be similar to the protection portion 40.

Next, the suppression of the warpage of the base portion 13 will be described.

As described above, the base portion 13 is made of metal such as stainless steel or aluminum alloy. On the other hand, the protection portion 40 is made of, for example, ceramics, glass, glass to which a filler is added, or the like. The insulating layer 11 is made of, for example, an inorganic material such as ceramics.

Therefore, as in the case of the above-described heater 1, also in the heater 12, thermal stress is generated due to the difference in thermal expansion coefficient between the materials. When thermal stress is generated, the heater 12 may warp.

As illustrated in FIGS. 8 to 11, the base portion 13 according to this embodiment is provided with the second portion 13*b*. The vicinity of both end portions of the second portion 13*b* in the Y direction is bent in the Z direction. That is, an end portion of the second portion 13*b* intersecting the first portion 13*a* is provided at the center region of the base portion 13 in the Y direction.

Since the end portion of the second portion 13*b* intersecting the first portion 13*a* extends in the X direction, it is possible to increase the bending rigidity of the base portion 13 in the X direction. Therefore, it is possible to suppress the base portion 13 from warping in the X direction.

Further, when the second portion 13*b* is provided, it is possible to increase the bending rigidity of the base portion 13 in the Y direction. Therefore, it is possible to suppress the base portion 13 from warping in the Y direction.

Further, the base portion 13 is provided with the third portion 13*c* that intersects the first portion 13*a*. Since the third portion 13*c* extends in the X direction, it is possible to increase the bending rigidity of the base portion 13 in the X direction. Therefore, it is possible to suppress the base portion 13 from warping in the X direction.

Additionally, although the third portion 13*c* extending continuously in the X direction is illustrated above, the third portion 13*c* or the plurality of third portions 13*c* arranged side by side in the X direction can be provided in a part of the region of the first portion 13*a* in the X direction when the X-direction dimension of the base portion 13 is small or the generated thermal stress is small.

Further, although the second portion 13*b* in which the vicinity of both end portions in the Y direction is bent in the Z direction is illustrated, the plate-shaped second portion 13*b* intersecting the first portion 13*a* can be provided when the Y-direction dimension of the base portion 13 is small or the generated thermal stress is small. In this way, the configuration of the second portion 13*b* can be simplified.

When the number of the third portions 13*c* is decreased, the third portion 13*c* is decreased in size, or the configuration of the second portion 13*b* is simplified, the manufacturing cost of the heater 12 can be reduced.

The number and size of the third portion 13*c*, the configuration of the second portion 13*b*, and the like can be appropriately determined through experiments and simulations to suppress the occurrence of warpage.

As described above, according to the heater 12 of this embodiment, it is possible to suppress the occurrence of the warpage in the heater 12 even when the material of the base portion 13 is metal.

FIGS. 12 to 21 are schematic perspective views illustrating a base portion according to another embodiment.

Figure 12:
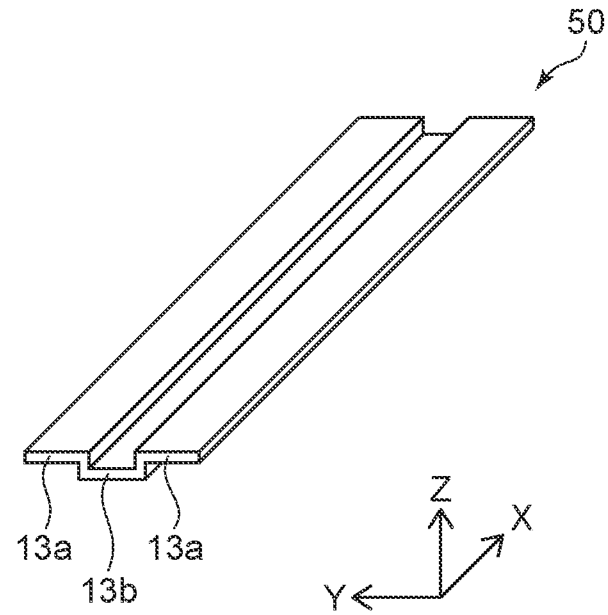
FIG. 12 is a schematic perspective view illustrating a base portion according to another embodiment.

As illustrated in FIG. 12, a base portion 50 includes the first portion 13*a* and the second portion 13*b*. That is, the base portion 50 is obtained by omitting the third portion 13*c* from the base portion 13.

For example, when the X-direction dimension or the Y-direction dimension of the base portion is small or the generated thermal stress is small, the generated warpage decreases. Further, even when the second portion 13*b* is provided or the third portion 13*c* is provided as described above, the bending rigidity of the base portion increases. Therefore, when the generated warpage is small, any one of the second portion 13*b* and the third portion 13*c* can be provided.

Additionally, the second portion 13*b* is provided and the third portion 13*c* is omitted in FIG. 12. However, the second portion 13*b* can be omitted and the third portion 13*c* can be provided. Further, when the second portion 13*b* is omitted and the third portion 13*c* is provided, the third portion 13*c* may be provided at both peripheral edges in the Y direction or the third portion 13*c* may be provided at one peripheral edge in the Y direction.

However, when the X-direction dimension or the Y-direction dimension of the base portion is large and the generated thermal stress is large, the above-described base portion 13 is preferable.

Figure 13:
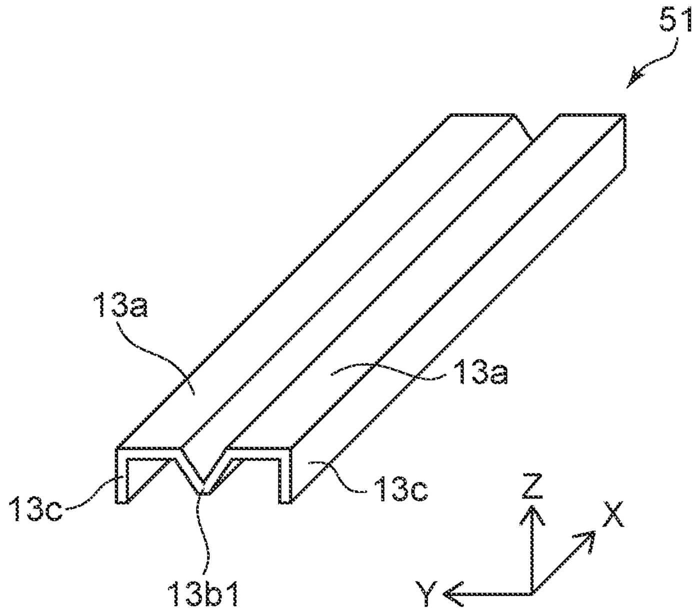
FIG. 13 is a schematic perspective view illustrating a base portion according to another embodiment.

As illustrated in FIG. 13, a base portion 51 includes, for example, the first portion 13*a*, a second portion 13*b*1, and the third portion 13*c*. The second portion 13*b* provided at the above-described base portion 50 has a shape in which the vicinity of both end portions in the Y direction is bent in the Z direction. On the other hand, the second portion 13*b*1 provided in the base portion 51 has a shape bent in the Z direction from the center in the Y direction (for example, a V-shaped cross-sectional shape). That is, both end portions of the second portion 13*b* in the Y direction may be bent toward the first portion 13*a*.

Even in the second portion 13*b*1 having a shape bent in the Z direction from the center in the Y direction, the bending rigidity of the base portion 51 and further the bending rigidity of the heater can be greatly improved. Therefore, the heater can be suppressed from warping. Further, the Y-direction dimension of the base portion 51 and further the Y-direction dimension of the heater can be decreased.

Figure 14:
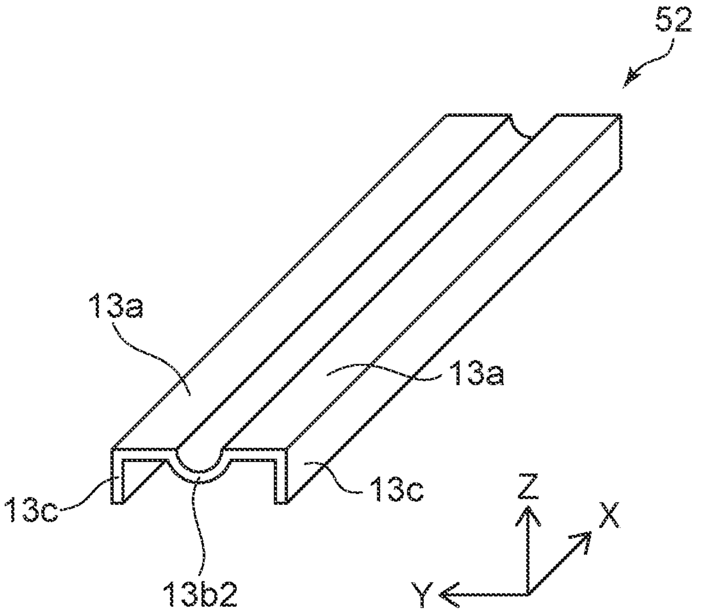
FIG. 14 is a schematic perspective view illustrating a base portion according to another embodiment.

As illustrated in FIG. 14, a base portion 52 includes, for example, the first portion 13*a*, a second portion 13*b*2, and the third portion 13*c*. The second portion 13*b*2 is curved in a convex shape toward the side opposite to the first portion 13*a*. That is, the second portion 13*b*2 has a shape curved in the Z direction. Even in the second portion 13*b*2 with such a shape, the bending rigidity of the base portion 52 and further the bending rigidity of the heater can be increased. Therefore, the heater can be suppressed from warping. Further, the Y-direction dimension of the base portion 52 and further the Y-direction dimension of the heater can be decreased.

Figure 15:
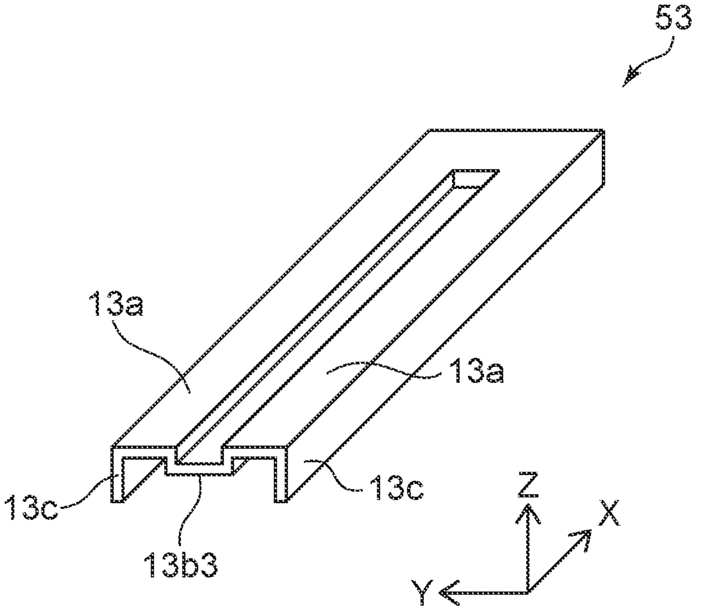
FIG. 15 is a schematic perspective view illustrating a base portion according to another embodiment.
Figure 16:
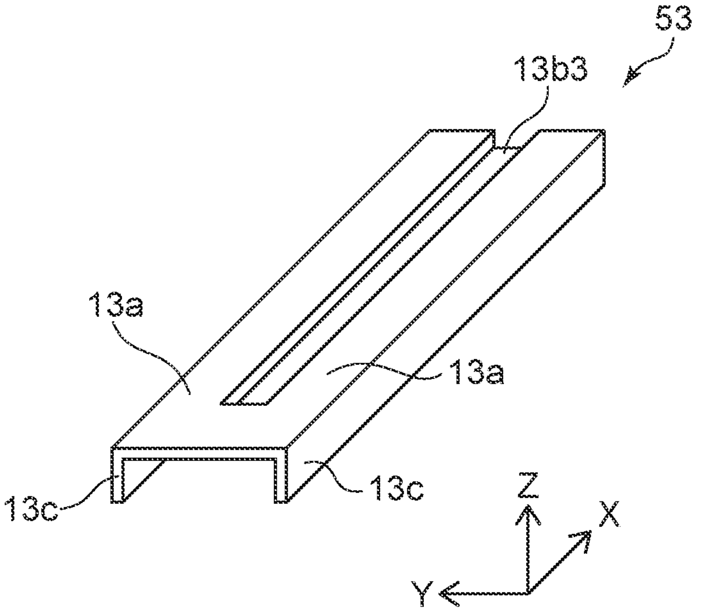
FIG. 16 is a schematic perspective view illustrating a base portion according to another embodiment.

As illustrated in FIGS. 15 and 16, a base portion 53 includes, for example, the first portion 13*a*, a second portion 13*b*3, and the third portion 13*c*. The positions of both end portions in the X direction of the second portion 13*b* provided in the above-described base portion 50 are the same as the positions of both end portions in the X direction of the first portion 13*a*. On the other hand, the position of one end portion in the X direction of the second portion 13*b*3 provided in the base portion 53 is the same as the position of one end portion in the X direction of the first portion 13*a*, but the position of the other end portion in the X direction of the second portion 13*b*3 is located on the inside of the position of the other end portion in the X direction of the first portion 13*a* (between the end portions in the X direction of the first portion 13*a*). As in the above-described second portion 13*b*, since the second portion 13*b*3 has a shape in which the vicinity of both end portions in the Y direction is bent in the Z direction, the bending rigidity of the base portion 53 can be increased.

Further, since the vicinity of one end portion of one first portion 13*a* is connected to the vicinity of one end portion of the other first portion 13*a* in the base portion 53, the bending rigidity of the first portion 13*a* and further the bending rigidity of the base portion 53 can be increased. Therefore, since the bending rigidity of the heater increases, the heater can be further suppressed from warping.

Figure 17:
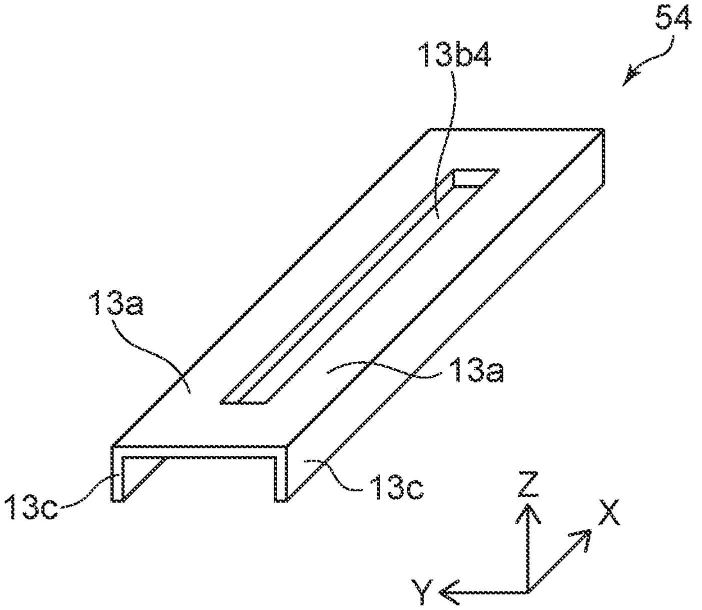
FIG. 17 is a schematic perspective view illustrating a base portion according to another embodiment.

As illustrated in FIG. 17, a base portion 54 includes, for example, the first portion 13*a*, a second portion 13*b*4, and the third portion 13*c*. The positions of both end portions in the X direction of the second portion 13*b*4 are located inside the positions of both end portions in the X direction of the first portion 13*a* (between the end portions in the X direction of the first portion 13*a*). Since the second portion 13*b*4 has a shape in which the vicinity of both end portions in the Y direction is bent in the Z direction, the bending rigidity of the base portion 54 can be increased.

Further, since the vicinity of both end portions of one first portion 13*a* is connected to the vicinity of both end portions of the other first portion 13*a* in the base portion 54, the bending rigidity of the first portion 13*a* and further the bending rigidity of the base portion 54 can be further increased. Therefore, since the bending rigidity of the heater increases, the heater can be more effectively suppressed from warping.

Figure 18:
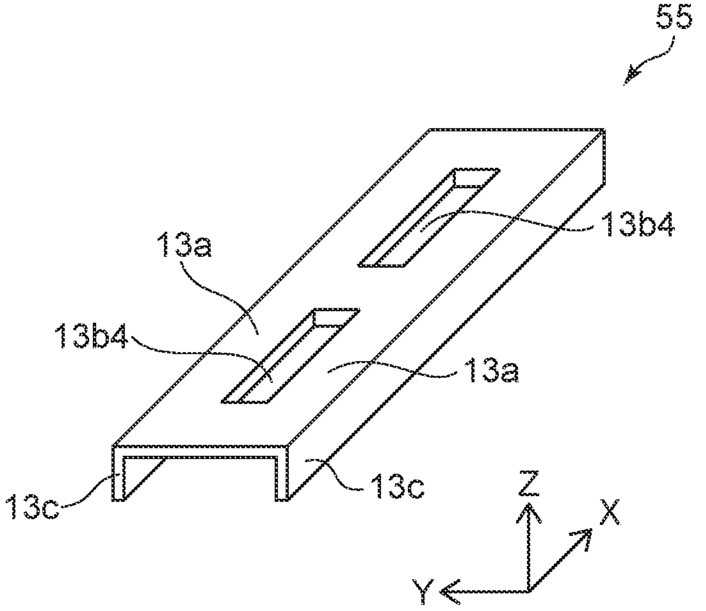
FIG. 18 is a schematic perspective view illustrating a base portion according to another embodiment.

As illustrated in FIG. 18, a base portion 55 includes a plurality of second portions **13*b*4. The plurality of second portions 13*b*4 can be arranged side by side at predetermined intervals in the X direction. In this way, since three or more positions of the first portion 13*a* and the first portion 13*a* arranged side by side in the Y direction can be connected, the rigidity of the first portion 13*a* can be further increased. Therefore, since the bending rigidity of the base portion 55** and further the bending rigidity of the heater increase, the heater can be more effectively suppressed from warping.

Additionally, in FIGS. 15 to 18, a case in which the vicinity of both end portions in the Y direction of the second portion is bent in the Z direction is described. However, as described in FIGS. 13 and 14, the same applies to the case in which the second portion has a shape bent in the Z direction from the center in the Y direction or the second portion has a shape curved in the Z direction.

Figure 19:
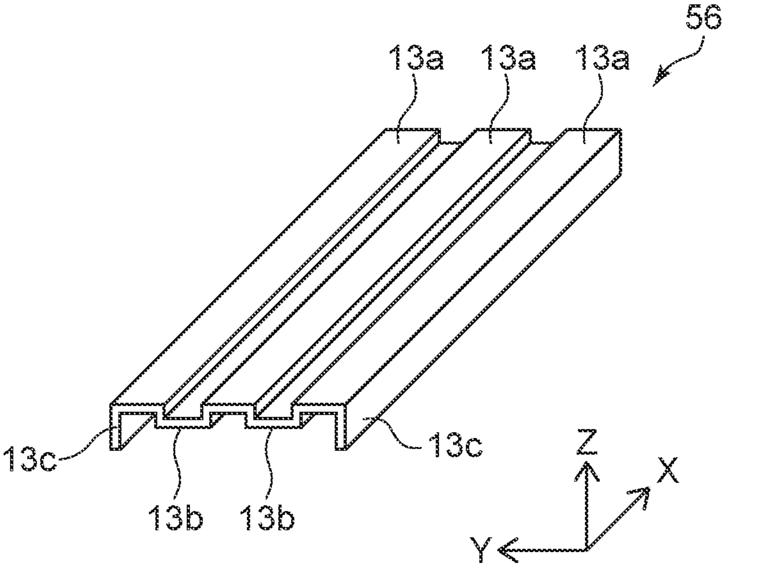
FIG. 19 is a schematic perspective view illustrating a base portion according to another embodiment.

As illustrated in FIG. 19, a base portion 56 includes three first portions **13*a* and two second portions 13*b*. However, the number of the first portions 13*a* and the number of the second portions 13*b* are not limited to those illustrated. The number of the first portions 13*a* can be three or more and the number of the second portions 13*b* can be two or more. In this case, as described above, the second portion 13*b* is provided between the first portion 13*a* and the first portion 13*a* in the Y direction. Therefore, the number of the second portions 13*b* is one less than that of the first portions 13*a***.

When the number of the first portions **13*a* increases, the number of the heating elements arranged side by side in the Y direction can be increased. However, when the number of the first portions 13*a* is simply increased, the bending rigidity of the base portion 56 decreases. In this case, when the second portion 13*b* is provided between the first portion 13*a* and the first portion 13*a*, a decrease in bending rigidity of the base portion 56 can be suppressed even when the number of the first portions 13*a* increases. Therefore, according to the base portion 56 of this embodiment, the number of the heating elements can be increased and a decrease in bending rigidity of the base portion 56** can be suppressed. As a result, it is possible to expand the heating range of the heater and prevent the heater from warping.

Figure 20:
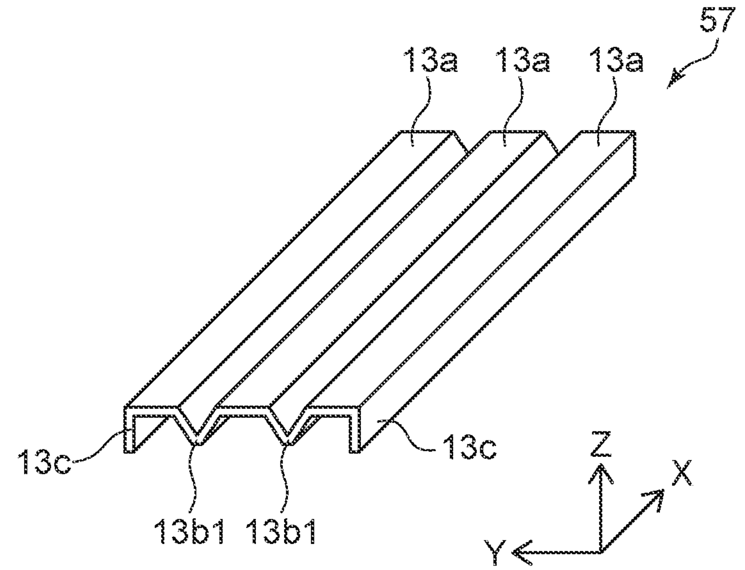
FIG. 20 is a schematic perspective view illustrating a base portion according to another embodiment.

As illustrated in FIG. 20, a base portion 57 includes three first portions **13*a* and two second portions 13*b*1. However, the number of the first portions 13*a* and the number of the second portions 13*b*1 are not limited to those illustrated. The number of the first portions 13*a* can be three or more and the number of the second portions 13*b*1 can be two or more. In this case, as described above, the second portion 13*b*1 is provided between the first portion 13*a* and the first portion 13*a* in the Y direction. Therefore, the number of the second portions 13*b*1 is one less than that of the first portions 13*a***.

As in the case of the base portion 56, according to the base portion 57 of this embodiment, the bending rigidity of the base portion 57 can be suppressed from being reduced even when the number of the first portions **13*a* increases. Therefore, when the base portion 57 is used, the number of the heating elements can be increased and a reduction in bending rigidity of the base portion 57** can be suppressed. As a result, it is possible to expand the heating range of the heater and prevent the heater from warping.

Figure 21:
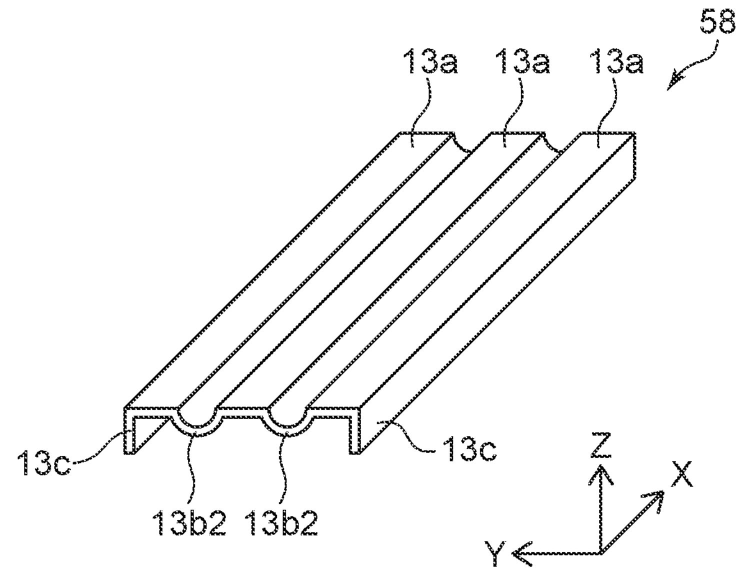
FIG. 21 is a schematic perspective view illustrating a base portion according to another embodiment.

As illustrated in FIG. 21, a base portion 58 includes three first portions **13*a* and two second portions 13*b*2. However, the number of the first portions 13*a* and the number of the second portions 13*b*2 are not limited to those illustrated. The number of the first portions 13*a* can be three or more and the number of the second portions 13*b*2 can be two or more. In this case, as described above, the second portion 13*b*2 is provided between the first portion 13*a* and the first portion 13*a* in the Y direction. Therefore, the number of the second portions 13*b*2 is one less than that of the first portions 13*a***.

As in the case of the above-described base portion 56, according to the base portion 58 of this embodiment, a decrease in bending rigidity of the base portion 58 can be suppressed even when the number of the first portions **13*a* increases. Therefore, according to the base portion 58, the number of the heating elements can be increased and a decrease in bending rigidity of the base portion 58** can be suppressed. As a result, it is possible to expand the heating range of the heater and prevent the heater from warping.

Figure 22:
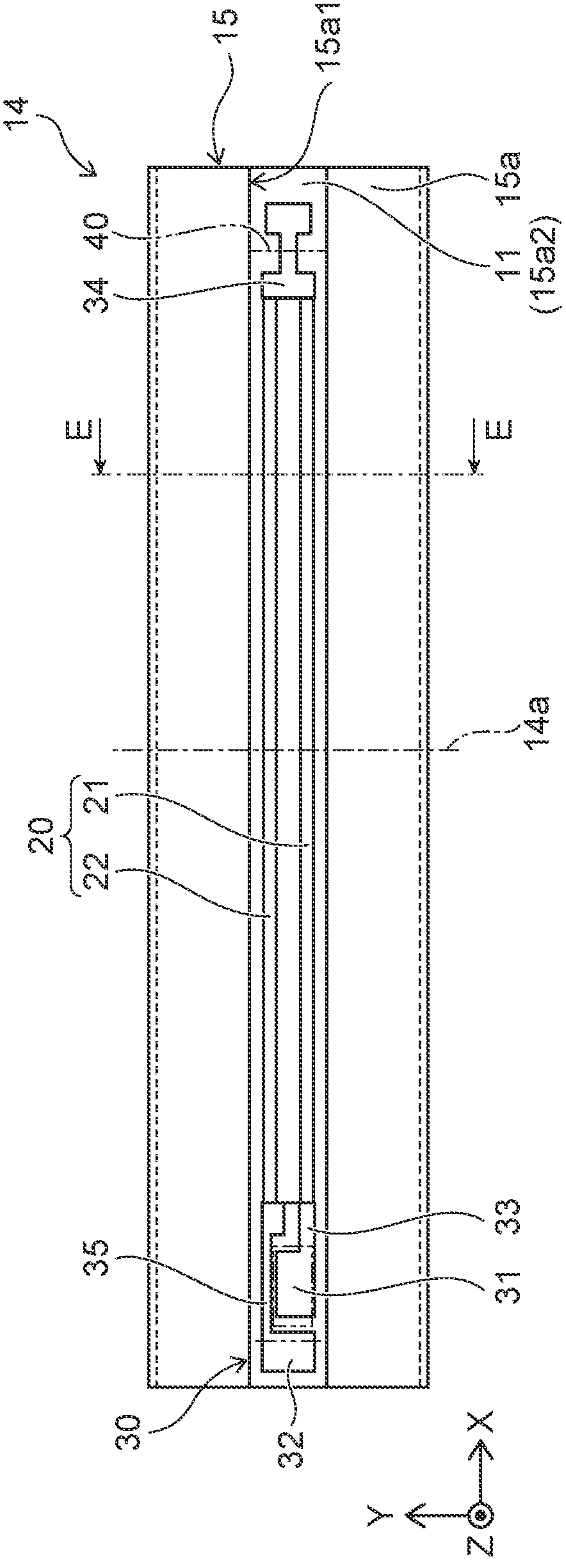
FIG. 22 is a schematic front view illustrating a heater according to another embodiment.

FIG. 22 is a schematic front view illustrating a heater 14 according to another embodiment.

Additionally, FIG. 22 is a view in which the heater 14 is viewed from the installation side of the heating portion 20.

Figure 23:
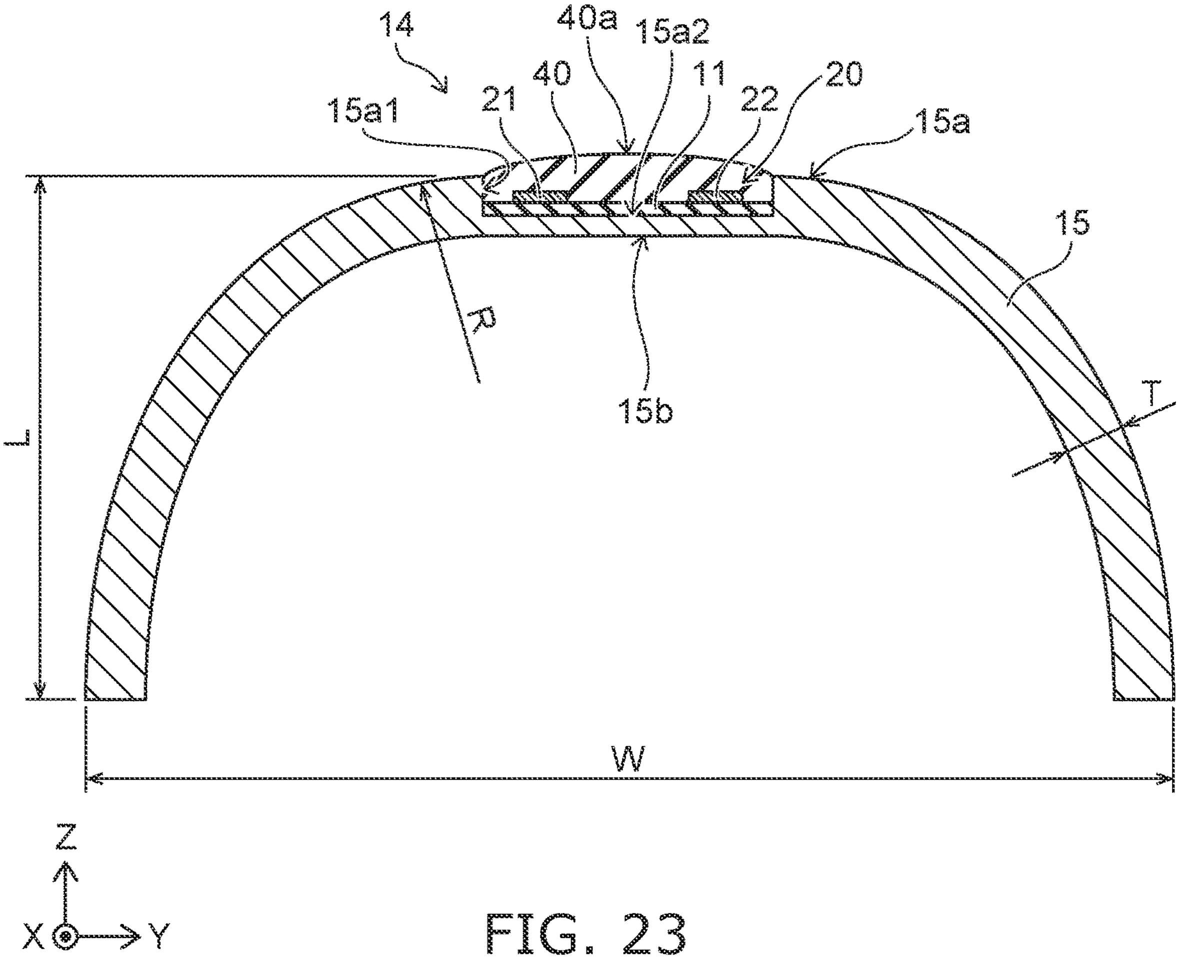
FIG. 23 is a schematic enlarged cross-sectional view in a direction taken along a line E-E of the heater of FIG. 22.

FIG. 23 is a schematic enlarged cross-sectional view in a direction taken along a line E-E of the heater 14 of FIG. 22.

As illustrated in FIGS. 22 and 23, the heater 14 includes, for example, a base portion 15, the insulating layer 11, the heating portion 20, the wiring portion 30, and the protection portion 40.

The peripheral edge of the base portion 15 extends in the Z direction. The base portion 15 has a plate shape and has a shape curved in the Z direction (the thickness direction). The base portion 15 extends in the X direction. A concave portion **15*i* is provided on the outer surface 15*a* corresponding to the convex curved surface of the base portion 15. The concave portion 15*al* opens to the outer surface 15*a* and extends in the X direction through the center of the outer surface 15*a***.

The thickness T of the base portion 15 is, for example, about 0.3 mm to 1.0 mm. The X-direction dimension of the base portion 15 can be appropriately changed according to the size of the heating object (for example, paper). The curvature radius R of the outer surface **15*a* in the vicinity of the concave portion 15*a*1 is, for example, 0.1 mm or more. When the curvature radius R of the outer surface 15*a* is set in this way, the heating object passing through the heater 14 is smoothly conveyed. Further, it is preferable not to form a step at the connection portion between the outer surface 15*a* of the base portion 15 and the outer surface 40*a* of the protection portion 40. In this way, the heating object passing through the heater 14** is further smoothly conveyed.

The base portion 15 is made of a material having heat resistance and high thermal conductivity. The base portion 15 can be made of, for example, metal such as stainless steel or aluminum alloy. The base portion 15 can be formed by, for example, plastic working such as bending or pressing, or drawing.

The thermal conductivity of metals is higher than that of inorganic materials such as ceramics. Therefore, when the base portion 15 is made of metal, it is possible to suppress the in-plane distribution of the temperature of the heater 14. Further, it is possible to improve the rigidity of the base portion 15, suppress the occurrence of cracks and chips, and reduce the manufacturing cost.

Additionally, details of suppression of warping in the base portion 15 will be described later.

The insulating layer 11 is provided on a bottom surface **15*a*2 of the concave portion 15*a*1 of the base portion 15. The insulating layer 11 extends in the X direction. The insulating layer 11 covers at least a region provided with the heating portion 20 in the bottom surface 15*a*2 of the concave portion 15*a*1. The insulating layer 11 can be formed by, for example, applying a paste-like material to the bottom surface 15*a*2 of the concave portion 15*a*1** using a screen printing method or the like and curing the material using a baking method or the like.

The heating portion 20 (the heating elements 21 and 22) is provided on the insulating layer 11. The heating portion 20 and the base portion 15 are insulated by the insulating layer 11.

Additionally, the number and size of the heating elements can be appropriately changed according to the size of the base portion 15 or the size of the heating object. Further, it is possible to provide a plurality of types of heating elements having different lengths, widths, shapes, and the like. That is, at least one heating element may be provided.

The heating element 21 and the heating element 22 can be provided to be arranged side by side at predetermined intervals in the Y direction (the lateral direction of the insulating layer 11). The heating element 21 and the heating element 22 extend in, for example, the X direction (the longitudinal direction of the insulating layer 11).

For example, the X-direction dimensions (the length dimensions) of the heating element 21 and the heating element 22 can be substantially the same. In this case, it is preferable that the respective centers of the heating element 21 and the heating element 22 are located on a line 14*a*. That is, it is preferable that each of the heating element 21 and the heating element 22 have a symmetrical shape with the line 14*a* as an axis of symmetry.

When the heater 14 is attached to the image forming apparatus 100, for example, the line 14*a* is made to overlap the center line of the conveying path of the heating object. In this way, the heating object can be substantially uniformly heated even when the dimension or position of the heating object in a direction orthogonal to the conveying direction changes.

The wiring portion 30 is provided on the insulating layer 11.

The wiring portion 30 includes, for example, the terminal 31, the terminal 32, the wiring 33, the wiring 34, and the wiring 35.

The arrangement, shape, material, function, and manufacturing method of the terminals 31 and 32, the wiring 33, the wiring 34, and the wiring 35 can be the same as those of the above-described heater 1.

Further, the heater 14 can be further provided with a detection unit that detects the temperature of the heating portion 20. The detection unit can be, for example, a thermistor. The detection unit can be provided, for example, in at least one of a position on the insulating layer 11 or a region facing the insulating layer 11 in the concave inner surface 15*b* facing the outer surface 15*a* of the base portion 15.

Next, the suppression of the warpage of the base portion 15 will be described.

As described above, the base portion 15 is made of metal such as stainless steel or aluminum alloy. On the other hand, the protection portion 40 is made of, for example, ceramics, glass, glass to which a filler is added, or the like. The insulating layer 11 is made of, for example, an inorganic material such as ceramics.

Therefore, when the heater 14 is used or manufactured, thermal stress is generated due to the difference in thermal expansion coefficient between the materials. When thermal stress is generated, the heater 14 may warp.

However, as illustrated in FIG. 23, the base portion 15 has a plate shape and has a shape curved in the Z direction (the thickness direction). According to the base portion 15 with such a shape, the bending rigidity of the base portion 15 can be increased. When the bending rigidity of the base portion 15 increases, the heater 14 can be suppressed from warping even when thermal stress is generated due to the difference in thermal expansion coefficient between the materials.

Further, a general heater including a plate-shaped base portion is attached to a stay of the fixing unit provided in the image forming apparatus.

Since the base portion 15 has a shape curved in the Z direction (the thickness direction), the base portion 15 can have a function of the stay. Therefore, since the heater 14 can be used in a fixing unit 200 to be described later as it is, the stay can be omitted. When the stay can be omitted, the configuration of the fixing unit 200 can be simplified.

In this case, it is preferable that the Z-direction dimension L of the base portion 15 is 1 mm or more and 5 mm or less. In this way, even when the heater 14 is used in the fixing unit 200 as it is, the heating object passing through the heater 14 is smoothly conveyed.

Further, when the Z-direction dimension L of the base portion 15 is set in this way, the bending rigidity of the base portion 15 can be increased. For example, even when the thickness T of the base portion 15 is about 0.3 mm to 1.0 mm, sufficient bending rigidity can be obtained against the generated thermal stress.

Further, it is preferable that the Y-direction dimension W of the base portion 15 is 4 mm or more and 10 mm or less. In this way, since the bending rigidity of the base portion 15 can be increased, sufficient bending rigidity can be obtained against the generated thermal stress, for example, even when the thickness T of the base portion 15 is about 0.3 mm to 1.0 mm.

As described above, according to the heater 14 of this embodiment, even when the material of the base portion 15 is metal, the heater 14 can be suppressed from warping and the configuration of the fixing unit 200 can be simplified.

Figure 24:
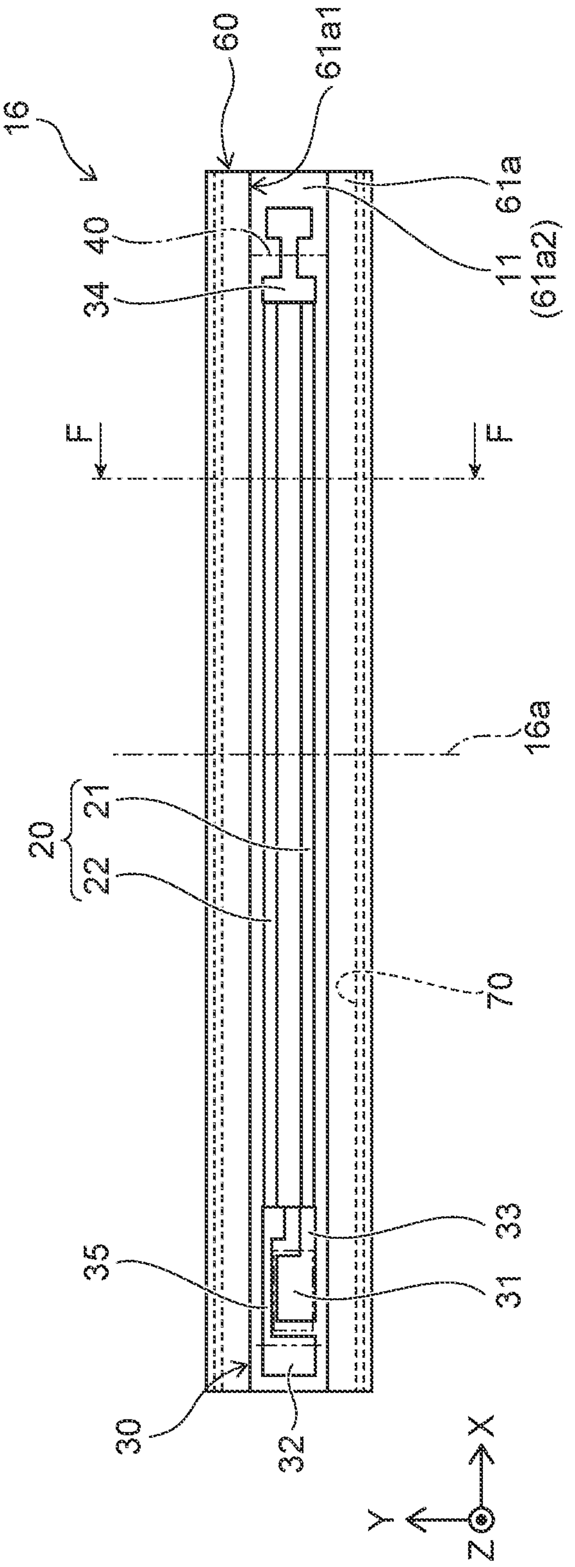
FIG. 24 is a schematic front view illustrating a heater according to another embodiment.

FIG. 24 is a schematic front view illustrating a heater 16 according to another embodiment.

Additionally, FIG. 24 is a view in which the heater 16 is viewed from the installation side of the heating portion 20.

Figure 25:
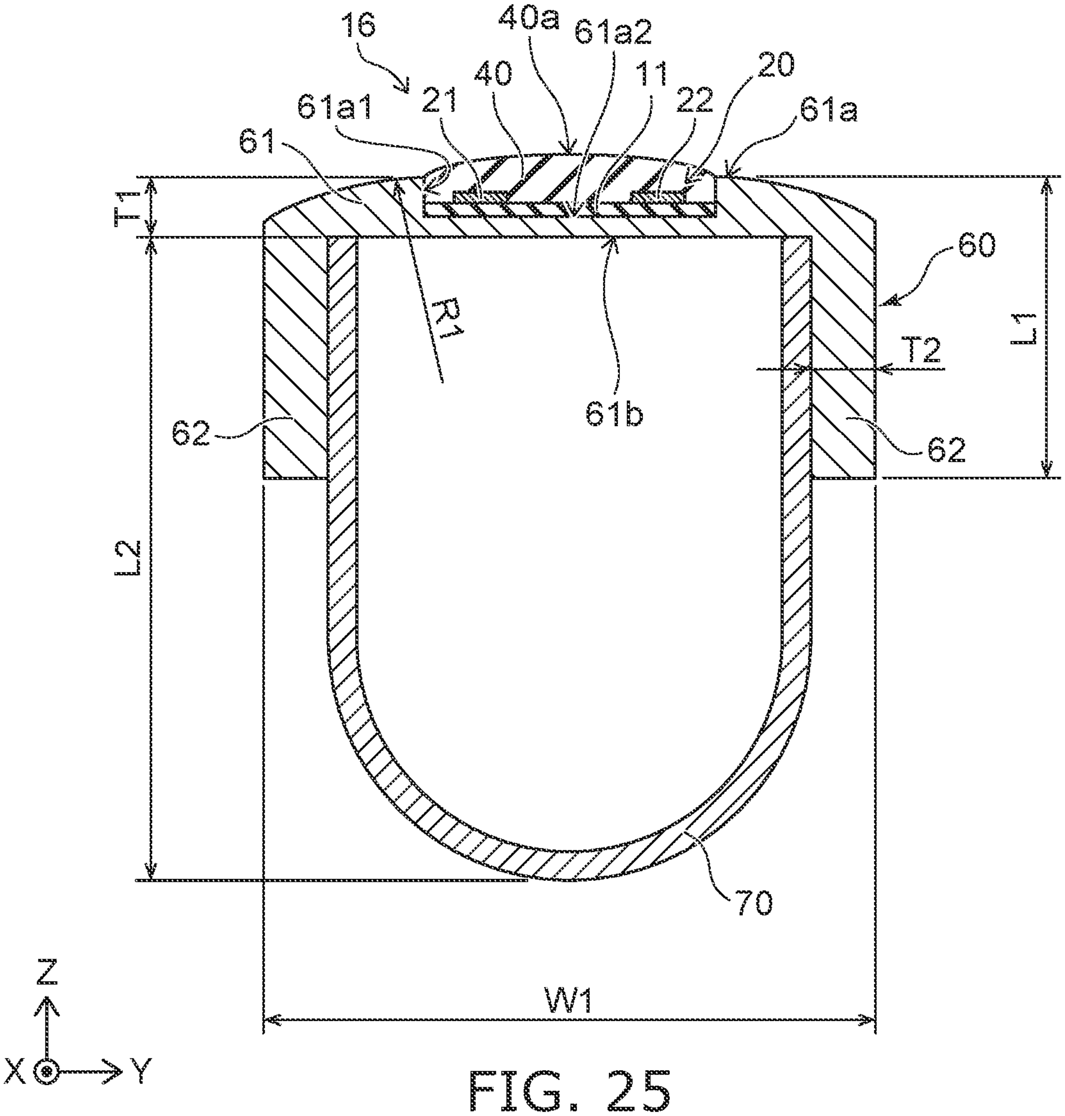
FIG. 25 is a schematic enlarged cross-sectional view in a direction taken along a line F-F of the heater of FIG. 24.

FIG. 25 is a schematic enlarged cross-sectional view in a direction taken along a line F-F of the heater 16 of FIG. 24.

As illustrated in FIGS. 24 and 25, the heater 16 includes, for example, a base portion 60, the insulating layer 11, the heating portion 20, the wiring portion 30, the protection portion 40, and a reinforced portion 70. Further, as in the above-described heater 1, the detection unit that detects the temperature of the heating portion 20 can be further provided.

Further, it is preferable that the respective centers of the heating element 21 and the heating element 22 are located on a line 16*a*. That is, it is preferable that each of the heating element 21 and the heating element 22 have a shape that is symmetrical about the line 16*a* as an axis of symmetry.

When the heater 16 is attached to the image forming apparatus 100, for example, the line 16*a* is made to overlap the center line of the conveying path of the heating object. In this way, the heating object can be substantially uniformly heated even when the dimension or position of the heating object in a direction orthogonal to the conveying direction changes.

The base portion 60 includes a first portion 61 and a second portion 62. The first portion 61 and the second portion 62 can be integrally formed with each other. The base portion 60 (the first portion 61 and the second portion 62) can be made of metal such as stainless steel or aluminum alloy. The base portion 60 can be formed by, for example, plastic working such as bending or pressing, or drawing.

The first portion 61 has a plate shape. The first portion 61 extends in the X direction. A concave portion 61*a*1 is provided on the outer surface 61*a* of the first portion 61 in the Z direction. The concave portion 61*a*1 opens to the outer surface 61*a*. The concave portion 61*a*1 extends in the X direction through the center of the outer surface 61*a*. Similarly to the above-described concave portion 15*al*, the insulating layer 11 is provided on a bottom surface 61*a*2 of the concave portion 61*a*1. The heating portion 20, the wiring portion 30, and the protection portion 40 are provided on the insulating layer 11. The protection portion 40 covers the heating portion 20 (the heating element 21 and the heating element 22) and a part of the wiring portion 30 (the wiring 33, the wiring 34, and the wiring 35). The terminal 31 and the terminal 32 of the wiring portion 30 are exposed from the protection portion 40.

The outer surface 61*a* of the first portion 61 can be a convex curved surface. The curvature radius R1 of the outer surface 61*a* in the vicinity of the concave portion 61*a*1 is, for example, 0.1 mm or more. When the curvature radius R1 of the outer surface 61*a* is set in this way, the heating object passing through the heater 16 is smoothly conveyed. Further, it is preferable not to form a step at the connection portion between the outer surface 61*a* of the first portion 61 and the outer surface 40*a* of the protection portion 40. In this way, the heating object passing through the heater 16 is further smoothly conveyed.

The second portion 62 has a plate shape and is provided as a pair. The second portion 62 is provided at each of both peripheral edges in the Y direction of the inner surface 61*b* facing the outer surface 61*a* of the first portion 61. The second portion 62 protrudes from the inner surface 61*b* in the Z direction. The pair of second portions 62 faces each other.

The X-direction dimension of the base portion 60 (the first portion 61 and the second portion 62) can be appropriately changed according to the size and the like of the heating object.

The thickness T1 of the first portion 61 and the thickness T2 of the second portion 62 are, for example, about 0.3 mm to 1.0 mm.

The Y-direction dimension of the base portion 60 (the Y-direction dimension of the first portion 61) W1 is, for example, about 4 mm to 10 mm.

The Z-direction dimension L1 of the base portion 60 can be 1 mm or more and 5 mm or less.

That is, the Y-direction dimension W1 of the base portion 60 can be smaller than the Y-direction dimension W of the above-described base portion 15. Further, the Z-direction dimension L1 of the base portion 60 can be smaller than the Z-direction dimension L of the above-described base portion 15. Therefore, the base portion 60 can be decreased in size.

However, when the Y-direction dimension W1 of the base portion 60 and the Z-direction dimension L1 of the base portion 60 are set in this way, the bending rigidity of the base portion 60 becomes smaller than the bending rigidity of the base portion 15.

Therefore, the heater 16 is provided with the reinforced portion 70.

As illustrated in FIG. 25, the reinforced portion 70 is provided on the inner surface 61*b* side of the first portion 61. The reinforced portion 70 is provided between one second portion 62 and the other second portion 62. The reinforced portion 70 extends in the Z direction. The reinforced portion 70 protrudes from the inner surface 61*b* of the first portion 61. The reinforced portion 70 has a plate shape and has a shape curved in the Z direction (the thickness direction). For example, the shape of the reinforced portion 70 when viewed from the X direction can be a U shape. One end portion of the reinforced portion 70 in the Y direction is connected to one second portion 62. The other end portion of the reinforced portion 70 in the Y direction is connected to the other second portion 62. For example, the end portion of the reinforced portion 70 can be welded, brazed, or connected using a fastening member such as a screw to the second portion 62.

The reinforced portion 70 can be made of, for example, metal such as stainless steel or aluminum alloy. The reinforced portion 70 can be formed by, for example, plastic working such as bending or pressing, or drawing.

The thickness of the reinforced portion 70 can be, for example, 0.3 mm or more and 2.0 mm or less. The Z-direction dimension L2 of the reinforced portion 70 can be, for example, 30 mm or more and 80 mm or less. The X-direction dimension of the reinforced portion 70 can be the same as, for example, the X-direction dimension of the base portion 60. Further, the plurality of reinforced portions 70 can be provided. That is, at least one reinforced portion 70 can be provided. When the plurality of reinforced portions 70 are provided, the plurality of reinforced portions 70 can be arranged side by side at predetermined intervals in the X direction.

When the reinforced portion 70 extending in the Z direction is connected to the base portion 60, the bending rigidity can be increased. Therefore, even when the Y-direction dimension W1 of the base portion 60 and the Z-direction dimension L1 of the base portion 60 are decreased, the heater 16 can be suppressed from warping.

Further, the base portion 60 (the first portion 61) having the convex curved surface (the outer surface 61*a*) can have the function of the stay. Therefore, since the heater 16 can be used in fixing units 200*a* and 200*b* to be described later as it is, the stay can be omitted. When the stay can be omitted, the configuration of the fixing units 200*a* and 200*b* can be simplified.

As described above, according to the heater 16 of this embodiment, even when the material of the base portion 60 is metal, the heater 16 can be suppressed from warping and the configuration of the fixing units 200*a* and 200*b* can be simplified.

(Image Forming Apparatus)

In an exemplary embodiment described herein, the image forming apparatus 100 including the heater 1 can be provided. All of the description of the above-described heater 1 and the modified example of the heater 1 (for example, the heater 12, the heater 14, and the heater 16) can be applied to the image forming apparatus 100.

Further, in the following, as an example, a case in which the image forming apparatus 100 is a copier will be described. However, the image forming apparatus 100 is not limited to a copier and may be any apparatus provided with a heater for fixing toner. For example, the image forming apparatus 100 can be a printer or the like.

Figure 26:
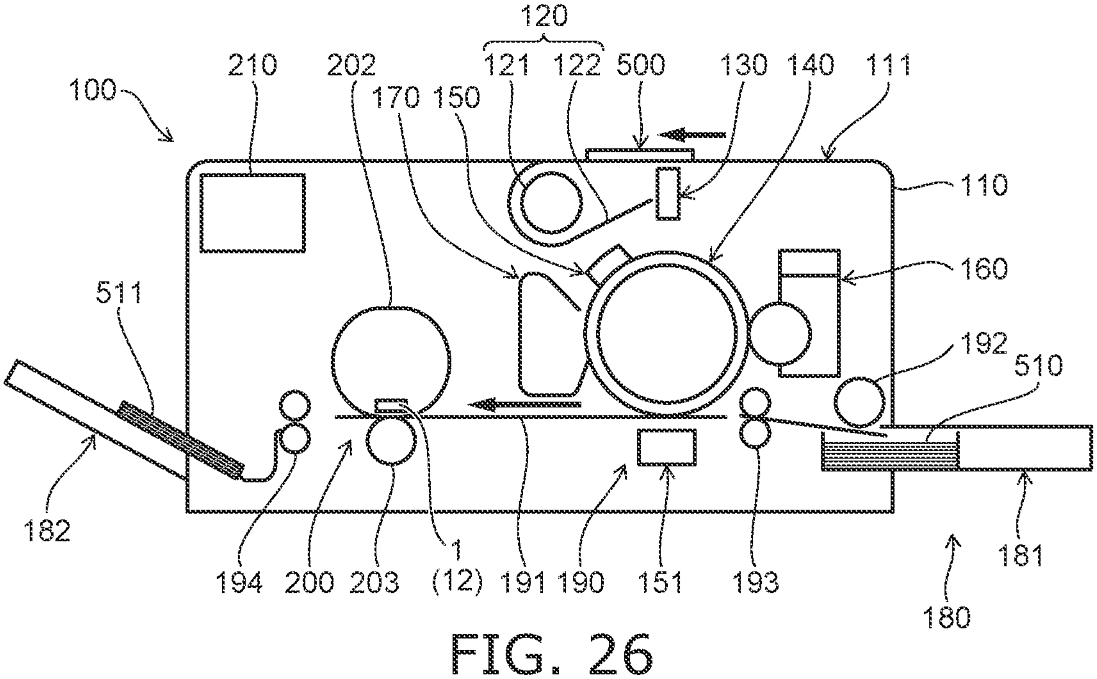
FIG. 26 is a schematic view illustrating an image forming apparatus according to this embodiment.

FIG. 26 is a schematic view illustrating the image forming apparatus 100 according to this embodiment.

Figure 27:
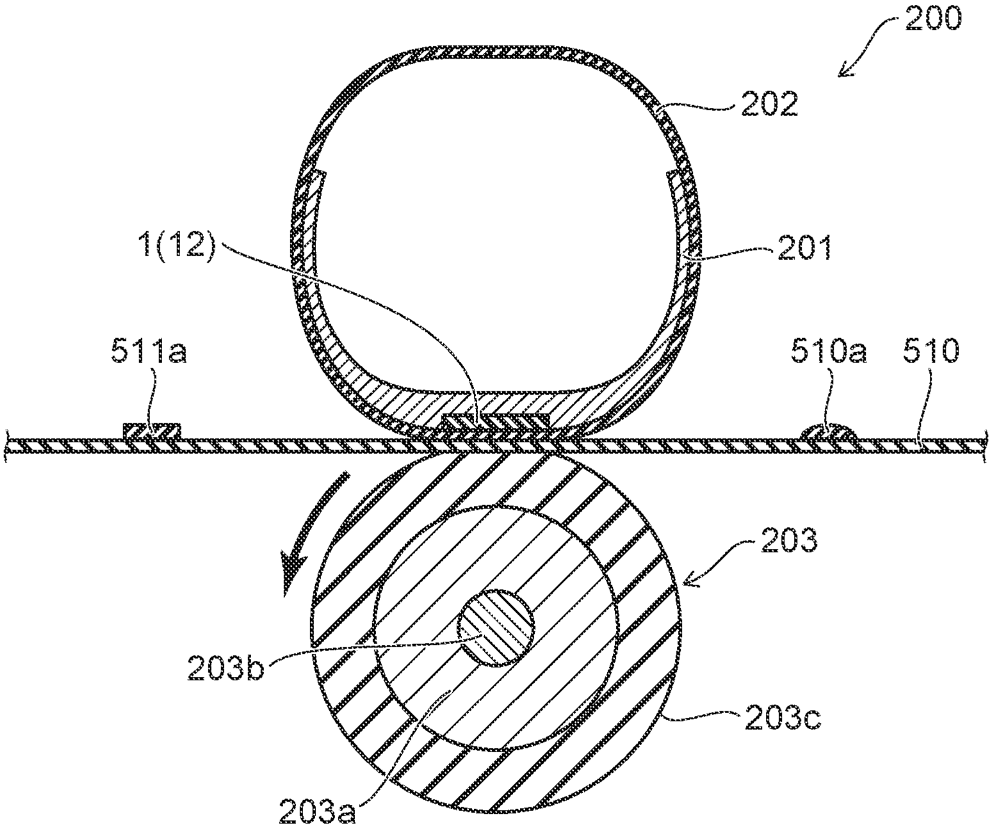
FIG. 27 is a schematic view illustrating a fixing unit.

FIG. 27 is a schematic view illustrating the fixing unit 200.

As illustrated in FIG. 26, the image forming apparatus 100 includes, for example, a frame 110, an illumination unit 120, an imaging element 130, a photosensitive drum 140, a charging unit 150, a discharging unit 151, a developing unit 160, a cleaner 170, a storage unit 180, a conveying unit 190, the fixing unit 200, and a controller 210.

The frame 110 has a box shape and accommodates the illumination unit 120, the imaging element 130, the photosensitive drum 140, the charging unit 150, the developing unit 160, the cleaner 170, a part of the storage unit 180, the conveying unit 190, the fixing unit 200, and the controller 210 therein.

A window 111 made of a translucent material such as glass can be provided on the top surface of the frame 110. A document 500 to be copied is placed on the window 111. Further, a moving unit that moves the position of the document 500 can be provided.

The illumination unit 120 is provided in the vicinity of the window 111. The illumination unit 120 includes, for example, a light source 121 such as a lamp and a reflecting mirror 122.

The imaging element 130 is provided in the vicinity of the window 111.

The photosensitive drum 140 is provided below the illumination unit 120 and the imaging element 130. The photosensitive drum 140 is provided to be rotatable. The surface of the photosensitive drum 140 is provided with, for example, a zinc oxide photosensitive layer or an organic semiconductor photosensitive layer.

The charging unit 150, the discharging unit 151, the developing unit 160, and the cleaner 170 are provided around the photosensitive drum 140.

The storage unit 180 includes, for example, a cassette 181 and a tray 182. The cassette 181 is detachably attached to one side portion of the frame 110. The tray 182 is provided at the side portion on the side opposite to the attachment side of the cassette 181 of the frame 110. The cassette 181 stores paper 510 (for example, blank paper) before copying is performed. The tray 182 stores paper 511 on which a copy image 511*a* is fixed.

The conveying unit 190 is provided below the photosensitive drum 140. The conveying unit 190 conveys the paper 510 between the cassette 181 and the tray 182. The conveying unit 190 includes, for example, a guide 191 which supports the conveyed paper 510 and conveying rollers 192 to 194 which convey the paper 510. Further, the conveying unit 190 can be provided with a motor that rotates the conveying rollers 192 to 194.

The fixing unit 200 is provided on the downstream side of the photosensitive drum 140 (the tray 182 side).

As illustrated in FIG. 27, the fixing unit 200 includes, for example, the heater 1 (12), a stay 201, a film belt 202, and a pressing roller 203.

The heater 1 (12) is attached to the conveying line side of the paper 510 of the stay 201. The heater 1 (12) can be embedded in the stay 201. In this case, the installation side of the protection portion 40 of the heater 1 (12) is exposed from the stay 201.

The film belt 202 covers the stay 201 provided with the heater 1 (12). The film belt 202 can contain, for example, heat-resistant resin such as polyimide.

The pressing roller 203 is provided to face the stay 201. The pressing roller 203 includes, for example, a core metal 203*a*, a drive shaft 203*b*, and an elastic portion 203*c*. The drive shaft 203*b* protrudes from an end portion of the core metal 203*a* and is connected to a drive device such as a motor. The elastic portion 203*c* is provided on the outer surface of the core metal 203*a*. The elastic portion 203*c* is made of an elastic material having heat resistance. The elastic portion 203*c* can contain, for example, silicone resin or the like.

The controller 210 is provided inside the frame 110. The controller 210 includes, for example, a calculation unit such as a CPU (Central Processing Unit) and a storage unit which stores a control program. The calculation unit controls the operation of each element provided in the image forming apparatus 100 based on the control program stored in the storage unit. Further, the controller 210 can also include an operation unit for inputting copying conditions by the user, a display unit for displaying operation status, error display, and the like.

Additionally, since a known technique can be applied to control each element provided in the image forming apparatus 100, detailed description thereof will be omitted.

Figure 28:
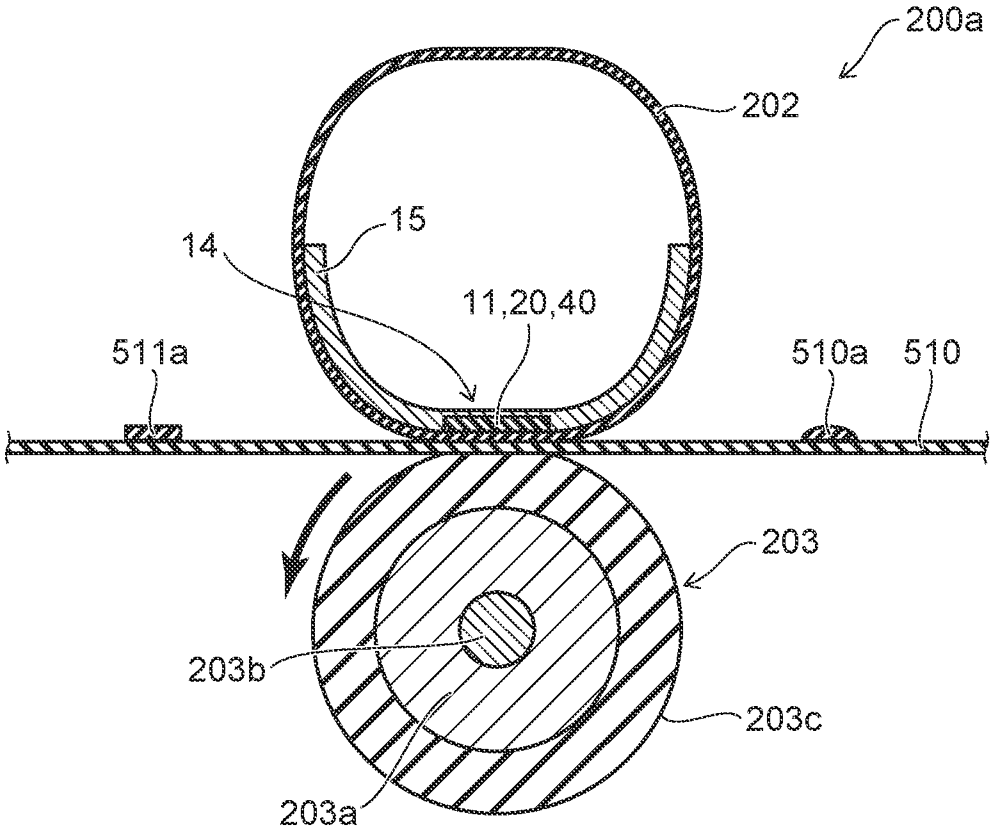
FIG. 28 is a schematic view illustrating a fixing unit according to another embodiment.

FIG. 28 is a schematic view illustrating the fixing unit 200*a* according to another embodiment.

As illustrated in FIG. 28, the fixing unit 200*a* includes, for example, the heater 14, the film belt 202, and the pressing roller 203.

The heater 14 is attached so that the installation side of the protection portion 40 faces the pressing roller 203.

Generally, the fixing unit is provided with a heater having a plate-shaped base portion, a stay used to attach the plate-shaped heater thereto, a film belt, and a pressing roller. As described above, according to the heater 14 of this embodiment, the base portion 15 having a shape curved in the Z direction (the thickness direction) can have a function of the stay. Therefore, since the stay can be omitted, the configuration of the fixing unit 200*a* can be simplified.

Figure 29:
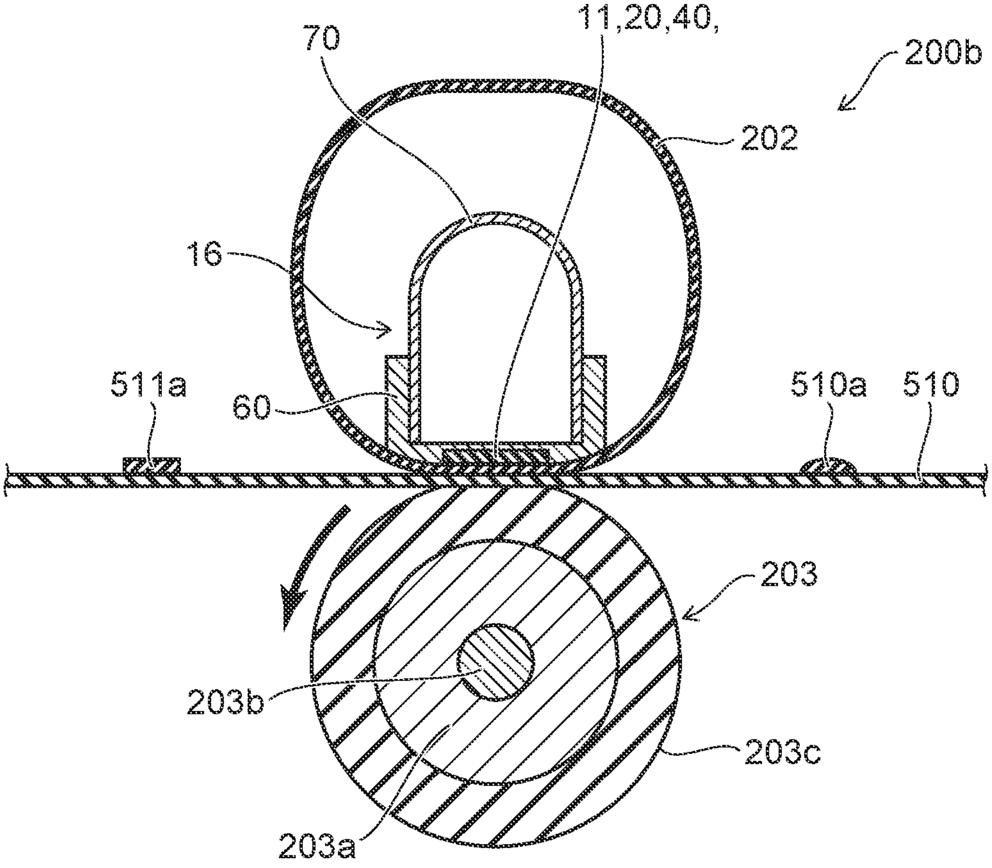
FIG. 29 is a schematic view illustrating a fixing unit according to another embodiment.

FIG. 29 is a schematic view illustrating the fixing unit 200*b* according to another embodiment.

As illustrated in FIG. 29, the fixing unit 200*b* includes, for example, the heater 16, the film belt 202, and the pressing roller 203.

The heater 16 is attached so that the installation side of the protection portion 40 faces the pressing roller 203. As described above, according to the heater 16 of this embodiment, the base portion 60 (the first portion 61) having the convex curved surface (the outer surface 61*a*) can have the function of the stay. Therefore, since the stay can be omitted, the configuration of the fixing unit 200*b* can be simplified.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A heater comprising:

a base portion which contains metal, extends in a first direction, and has a first surface and a second surface facing the first surface;

an insulating layer which is provided on the first surface side of the base portion;

a heating element which is provided on the insulating layer and extends in the first direction;

a protection portion which covers the heating element;

a reinforced portion which has a plate shape;

a first peripheral edge of the base portion in a second direction intersecting the first direction extends in a third direction intersecting the first direction and the second direction; and a second peripheral edge of the base portion opposite the first peripheral edge of the base portion in the second direction extends in the third direction, wherein a shape of the reinforced portion when viewed from the first direction being a U shape, a first end of the reinforced portion being connected to the first peripheral edge of the base portion in the second direction, and a second end of the reinforced portion being connected to the second peripheral edge of the base portion in the second direction.

2. The heater according to claim 1, wherein a shape of the base portion when viewed from the third direction is a rectangular shape, and at least one of four peripheral edges of the rectangular shape extends in the third direction.

3. The heater according to claim 1, wherein when an inclination angle between the second surface and the first peripheral edge of the base portion extending in the third direction is θ, the following expression of $90° < \theta \leq 160°$ or $20° \leq \theta < 90°$ is satisfied.

4. The heater according to claim 1, wherein a distance between the second surface and an end portion of the first peripheral edge of the base portion extending in the third direction is 0.3 mm or more and 5.0 mm or less.

5. The heater according to claim 1, wherein the base portion includes a plurality of first portions which are arranged side by side at predetermined intervals in the second direction and a second portion which is provided between one of the first portions and another of the first portions in the second direction and intersects a peripheral edge of the one first portion and the other first portion.

6. The heater according to claim 5, wherein the base portion further includes a third portion which intersects a peripheral edge on the side opposite to an installation side of the second portion of the one first portion and the other first portion in the second direction, and the second portion and the third portion are provided on the same side of the one first portion and the other first portion in the third direction.

7. The heater according to claim 5, wherein the insulating layer is provided on the side opposite to an installation side of the second portion of the plurality of first portions.

8. The heater according to claim 7, wherein the insulating layer is further provided on the first portion side of the second portion.

9. The heater according to claim 7, wherein the heating element is provided on the insulating layer provided on the one first portion.

10. The heater according to claim 5, wherein both end portions of the second portion in the second direction are bent toward the one first portion and the other first portion or the second portion is curved in a convex shape toward the side opposite to the side of the one first portion.

11. The heater according to claim 6, wherein the one first portion, the other first portion, the second portion, and the third portion are integrally formed with each other.

12. The heater according to claim 1, wherein the base portion further includes a concave portion which opens to the first surface and extends in the first direction, the first surface is a convex curved surface, and the insulating layer is provided on a bottom surface of the concave portion.

13. The heater according to claim 12, wherein the base portion has a shape curved in the third direction, and the concave portion opens to the first surface.

14. The heater according to claim 12, wherein a curvature radius of the first surface in the vicinity of the concave portion is 0.1 mm or more.

15. The heater according to claim 12, wherein a dimension of the base portion in the third direction is 1 mm or more and 5 mm or less.

16. The heater according to claim 12, wherein a dimension of the base portion in the second direction is 4 mm or more and 10 mm or less.

17. The heater according to claim 1, wherein a distance between the first surface and the second surface of the base portion is 0.3 mm or more and 1.0 mm or less.

18. The heater according to claim 1, wherein the metal is stainless steel or an aluminum alloy.

19. An image forming apparatus comprising:

the heater according to claim 1.

* * * * *